Oct. 17, 1961
E. O. SCHWEITZER, JR
3,004,381
ELECTRICAL SYSTEM
Filed April 6, 1956
9 Sheets-Sheet 1
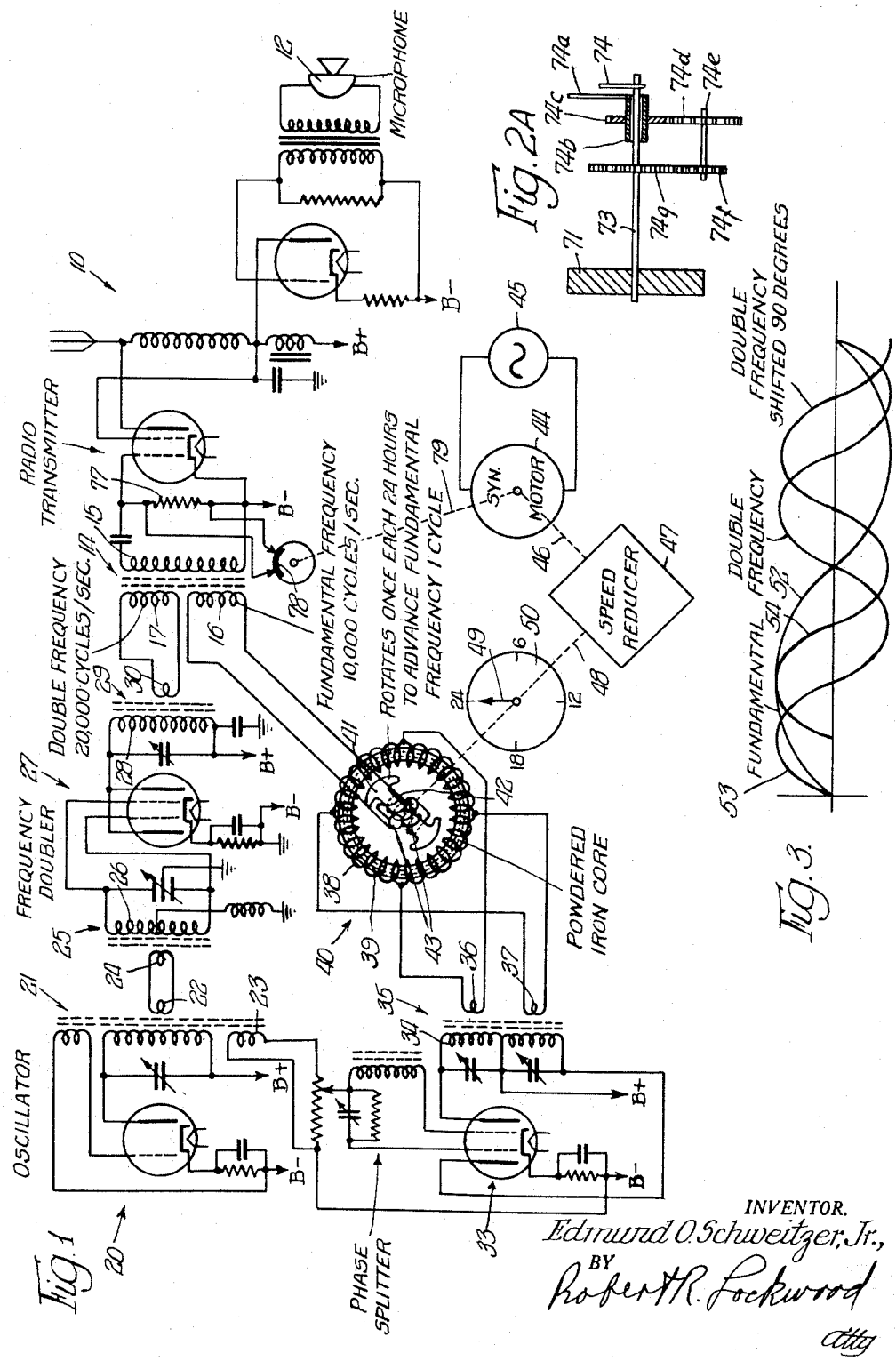
INVENTOR.
Edmund O. Schweitzer, Jr.,
BY
Robert R. Lockwood
Atty

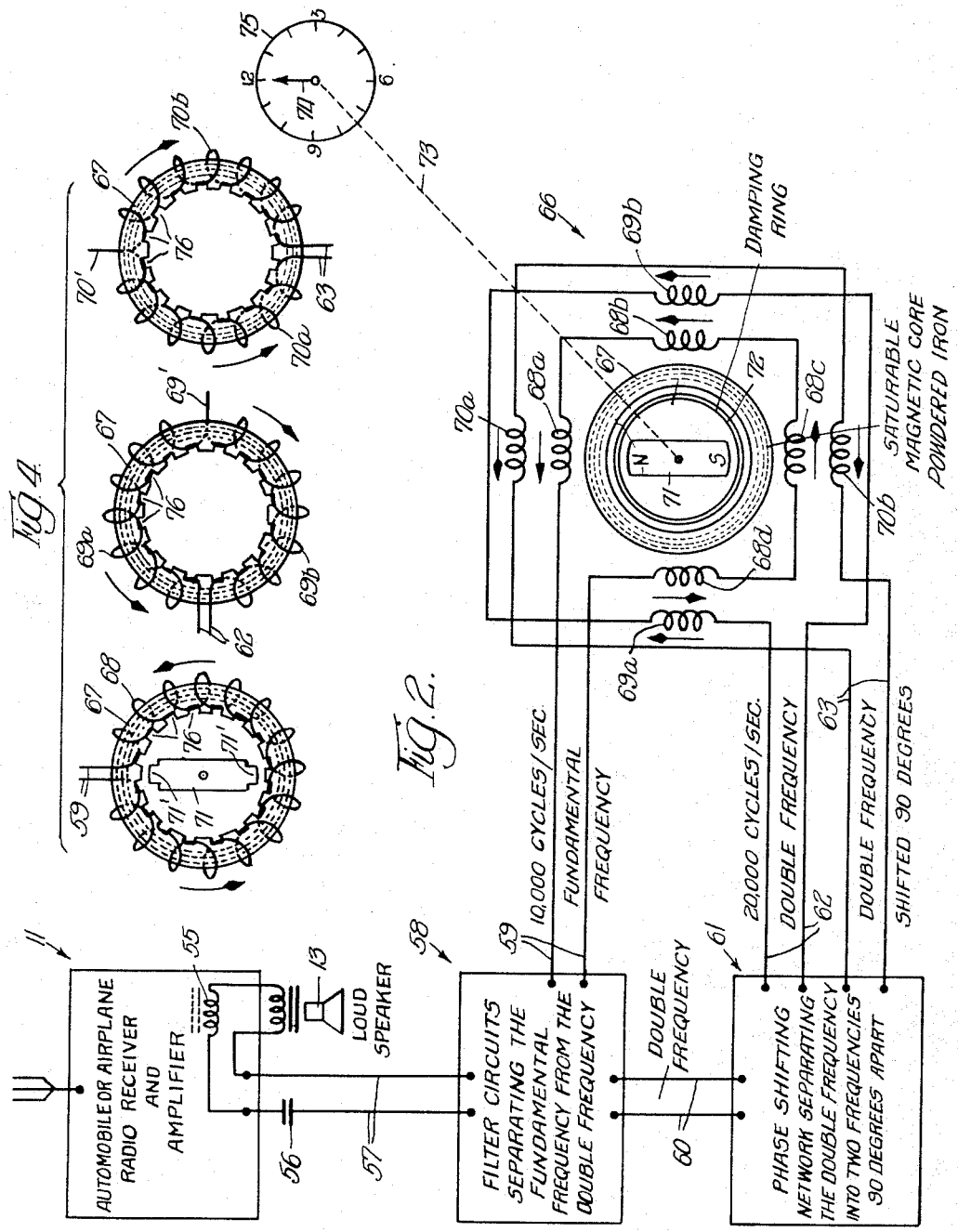

Oct. 17, 1961     E. O. SCHWEITZER, JR     3,004,381
ELECTRICAL SYSTEM
Filed April 6, 1956     9 Sheets-Sheet 3
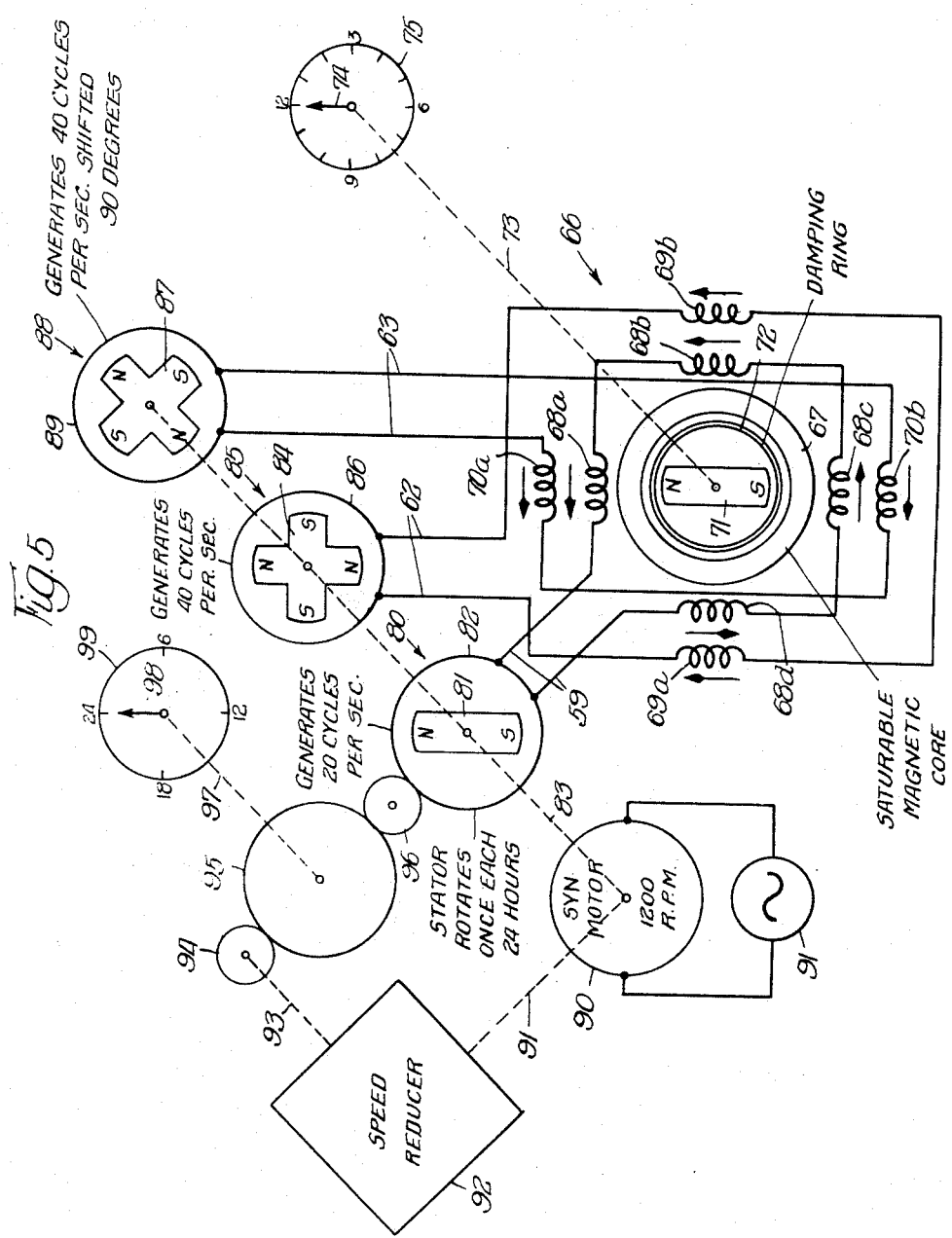
INVENTOR.
Edmund O. Schweitzer, Jr.,
BY Robert R. Lockwood

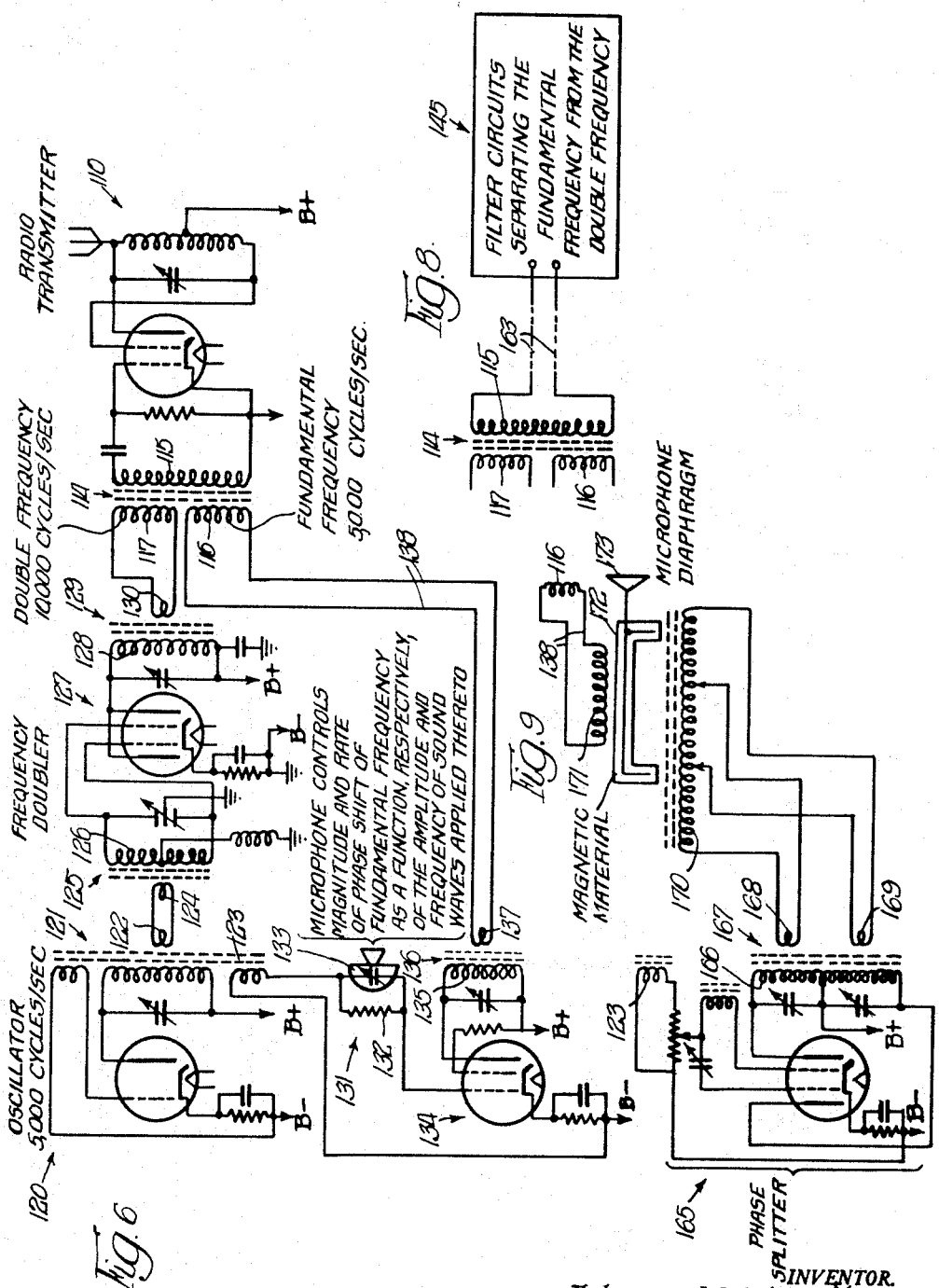

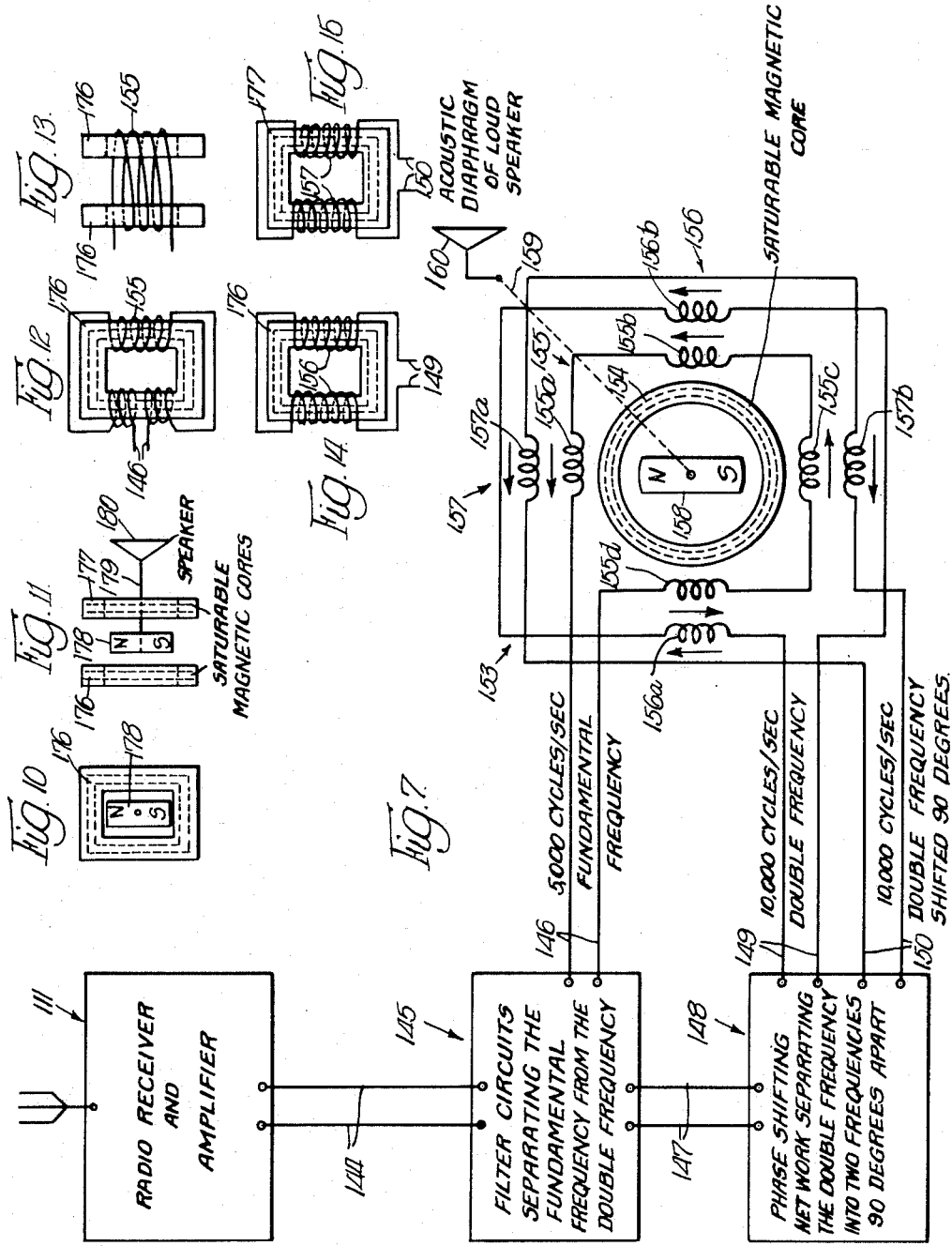

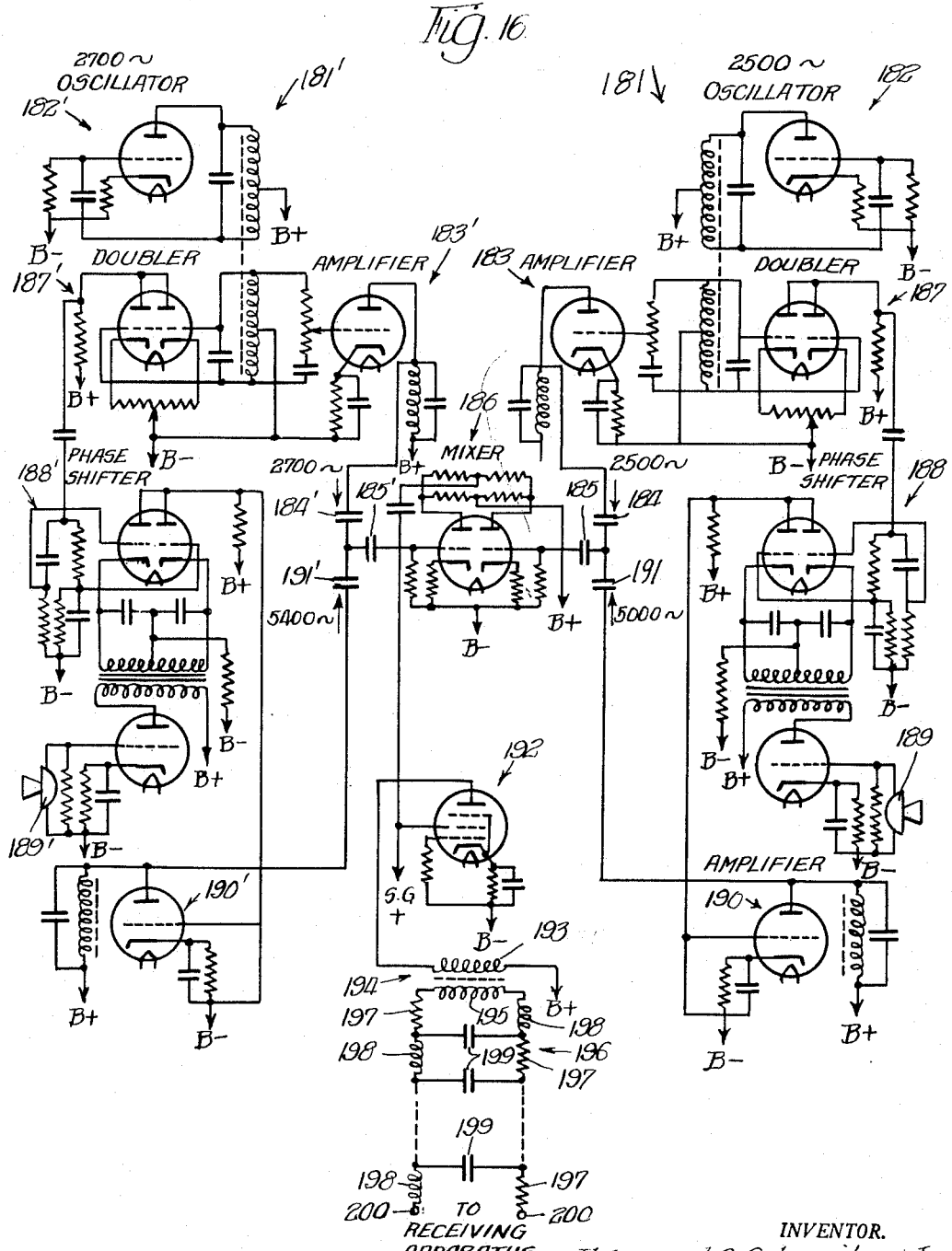

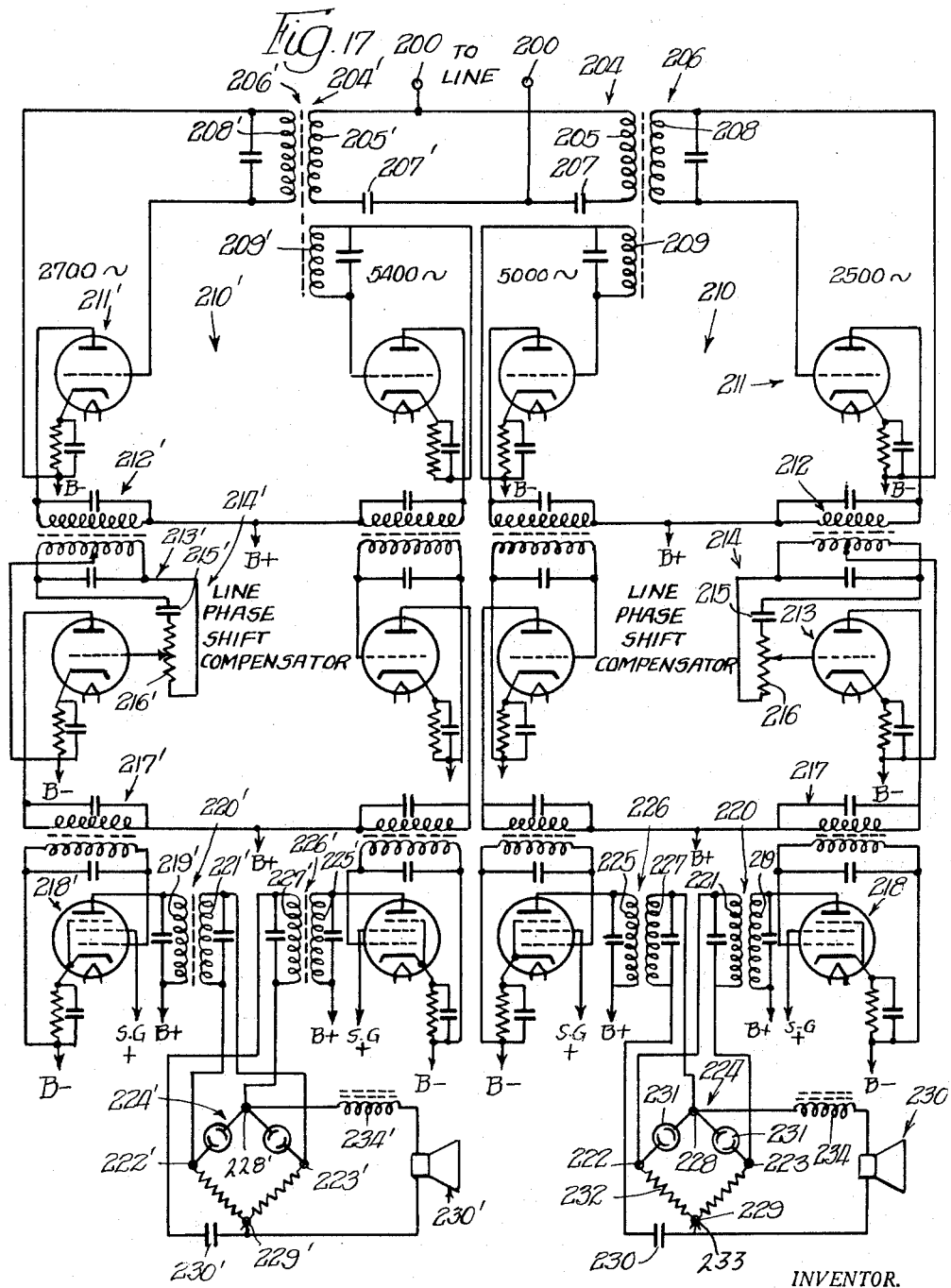

Oct. 17, 1961 — E. O. SCHWEITZER, JR — 3,004,381
ELECTRICAL SYSTEM
Filed April 6, 1956 — 9 Sheets-Sheet 8

INVENTOR.
Edmund O Schweitzer, Jr.,
BY
Robert R. Lockwood
Atty.

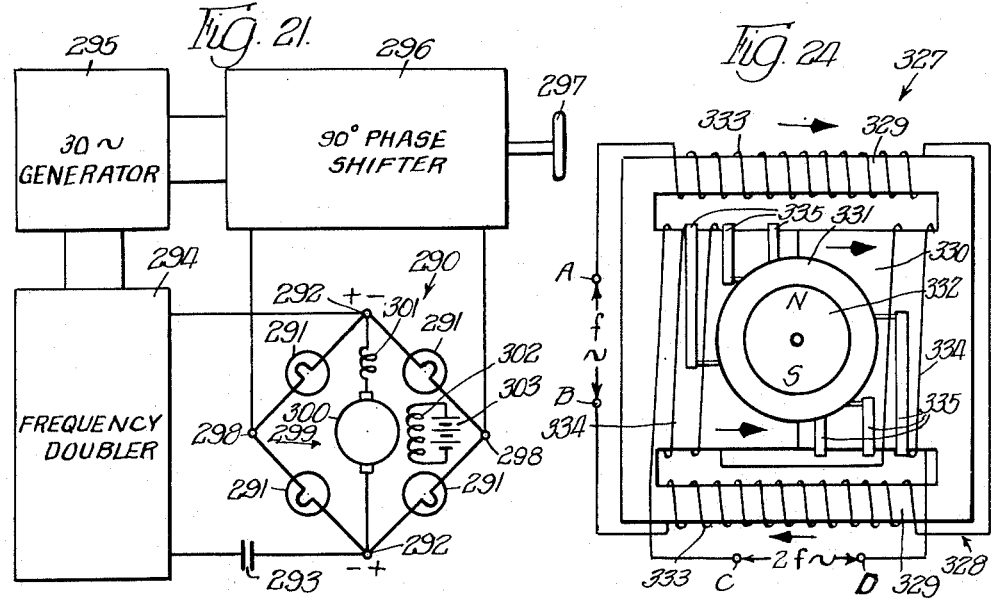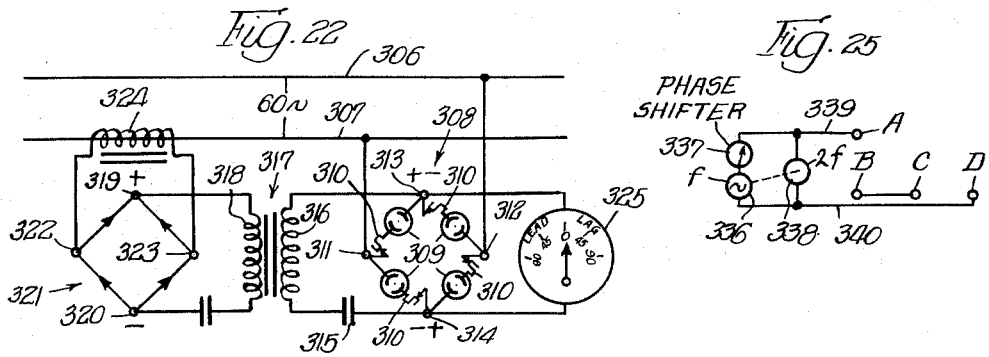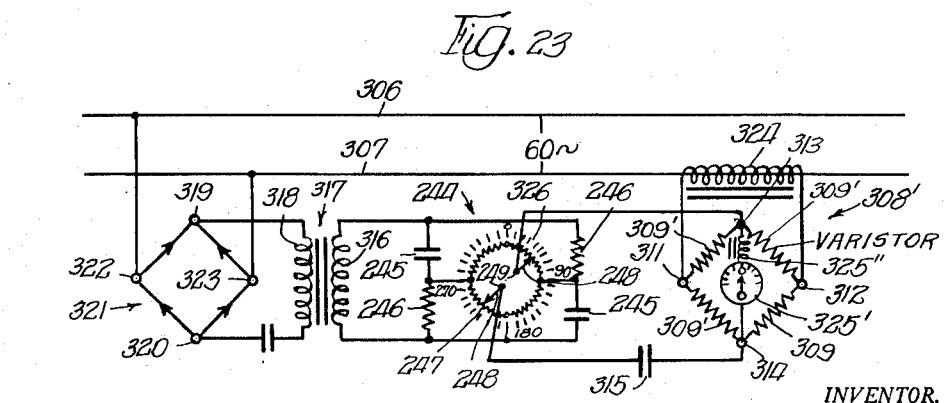

United States Patent Office 3,004,381
Patented Oct. 17, 1961

3,004,381
ELECTRICAL SYSTEM
Edmund O. Schweitzer, Jr., 1002 Dundee Road,
Northbrook, Ill.
Filed Apr. 6, 1956, Ser. No. 576,564
24 Claims. (Cl. 58—24)

This invention relates, generally, to electrical systems and it has particular relation to remote control systems, remote indicating systems and the like. This application is a continuation-in-part of copending application Serial No. 466,480, filed November 3, 1954, now abandoned and of copending application Serial No. 485,927, filed February 3, 1955, now abandoned.

A particular application of this invention is for operating automobile or airplane clocks. While it is now conventional to equip automobiles and airplanes with spring or electrically driven clocks, it is usually the case that they become inoperative after a relatively short time. In accordance with this invention the clock of an automobile or airplane is operated from a master clock when the radio set on the vehicle is turned on. The use of this invention is by no means limited to this particular application. It is illustrated to show a desirable use of the invention. When employed it avoids the necessity for winding and setting the clock of the automobile or airplane and adjusting it for accuracy.

Accordingly, among the objects of this invention are: To provide for operating a plurality of slave clocks from a master clock either by way of a metallic circuit or a radio circuit; to provide for operating an automobile or airplane clock via radio; to operate the clock to show the correct time when the radio in the automobile or airplane is turned on; to drive the clock mechanism continuously or intermittently as may be desired; to induce alternating magnetic fluxes in an annular magnetic core in such manner as to produce a unidirectional field; to induce an alternating magnetic flux in the core and also a shifting alternating magnetic flux the frequency of which is twice that of said alternating magnetic flux in order to produce the unidirectional field; to shift the relative phase relationship between the fluxes in such manner as to effect a corresponding shift in the unidirectional field; to effect the shift of the phase relationship as a function of a variable such as time; to provide a magnetic member responsive to the unidirectional field; and to drive indicating means, such as a clock mechanism, or control means by said magnetic member.

Another application of this invention is for operating time keeping systems which employ a master clock and a plurality of slave clocks all interconnected by a metallic circuit. When the present invention is employed, it is unnecessary to provide complicated and expensive adjusting mechanisms for maintaining the slave clocks in synchronism with the master clock. Regardless of the time at which the slave clock is connected to the circuit, it will immediately show the correct time. This is the case whether a metallic link or a radio link is employed for interconnecting the master clock with the slave clock or clocks.

This invention can be employed in communication systems such as telephone and radio systems for transmitting waves in order to reproduce sound waves or speech. At the present time only a single voice channel is available at a given carrier frequency. For example, over a simple telephone circuit employing no carrier frequencies, only a single voice channel is provided. Where carrier frequencies are employed, only one conversation can be carried on for each carrier frequency. Likewise, in radio transmission, only a single voice channel is available for each transmitting frequency. When the present invention is employed, a number of paths is provided for each previous single channel. That is, where only a single voice communication channel was previously available for telephone communication (a single circuit or a carrier frequency circuit for a long distance land circuit or under water cable circuit), or for radio broadcasting (the transmitting frequency of the station could be modulated by only a single program), when the present invention is used, a number of control and voice paths is available for each previous single channel. To illustrate, instead of broadcasting a single program over a given ratio transmitting frequency, a number of programs can be transmitted over this given frequency. They can be segregated into control, voice and music programs, recognizing that control functions can be carried out at low frequencies, that the speaking voice requires a relatively narrow range of frequencies and that music encompasses the entire frequency range to which the ear is sensitive. Thus, it is possible to expand the use of the present communications channels without increasing their number or to decrease the number of carrier channels and increase the number of paths.

Among other objects of this invention are: To convert waves, such as sound waves, into a composite wave the shape of which is a function of certain variable characteristics of the waves; to shift the relative phase relationship between single and double frequency alternating currents as a function of the amplitude and frequency of the waves; to effect the phase shift by moving an armature under the control of the waves to be transmitted in a magnetic field generated by one of the frequencies; to generate a unidirectional field by combining the single and double frequency currents the position of which field shifts as a function of the amplitude and frequency of the sound waves; to employ either a rotary or a translatory movement for reconverting the composite wave into waves corresponding to the transmitted waves; to transmit a plurality of programs, i.e., control, voice, music, etc., over a single communication channel; and to accomplish this by modulating one or the other of a pair of frequencies bearing a fixed relation to each other and employing a plurality of sets of such frequencies, the sets being separated from each other through an extent sufficient to permit segregation thereof by suitable filter circuits.

Still other objects are: To provide for phase shift through 360° in a simple and efficient manner; to convert a pair of alternating currents having a fixed relation to each other into direct current; to vary the magnitude and direction of flow of the direct current by shifting the relative phase positions of the alternating currents; to employ the direct current output for operating a receiver, loud speaker, motor or like device requiring variations in magnitude of current flow or reversal of current flow for operation or for other purposes; to measure power factor of an alternating current circuit in a new and improved manner; and avoid the necessity for splitting the phase of one of the pair of frequencies for operating the receiver such as ear phones or a loud speaker or a motor.

Other objects of this invention will, in part, be obvious and in part appear hereinafter.

This invention is disclosed in the embodiments thereof shown in the accompanying drawings and it comprises the features of construction, combination of elements, arrangement of parts, and methods of operation which will be exemplified in the constructions, systems and methods hereinafter set forth and the scope of the application of which will be indicated in the appended claims.

For a more complete understanding of the nature and scope of this invention reference can be had to the following detailed description, taken together with the accompanying drawings, in which:

FIGURE 1 illustrates diagrammatically control and transmitting means that can be employed in practicing this invention;

FIGURE 2 illustrates diagrammatically the receiving and controlled apparatus that is used in conjunction with the apparatus shown in FIGURE 1 for practicing this invention;

FIGURE 2A shows, partly in side elevation and partly in section, a gear train interconnecting the hour hand with the minute hand for use in conjunction with the receiving apparatus shown in FIGURE 2;

FIGURE 3 shows curves which demonstrate certain operating characteristics of this invention;

FIGURE 4 shows alternate winding arrangements for the magnetic core of the dynamo electric device employed in the embodiment of the invention illustrated in FIGURE 2;

FIGURE 5 illustrates diagrammatically an alternate control system for the dynamo electric device;

FIGURE 6 illustrates diagrammatically the control and transmitting means that can be employed in practicing this invention for voice transmission;

FIGURE 7 illustrates diagrammatically the receiving and controlled apparatus that can be used in conjunction with the apparatus shown in FIGURE 6 for practicing this invention;

FIGURE 8 illustrates diagrammatically how the apparatus shown in FIGURES 1, 2, 6 and 7 can be interconnected by a conductive circuit rather than through radio transmitting and receiving means;

FIGURE 9 illustrates diagrammatically a modified form of transmitting control means for use alternatively in the circuit connections illustrated in FIGURE 6;

FIGURE 10 is a view, in front elevation, of a modified form of transducer for use in lieu of the transducer illustrated in FIGURE 7;

FIGURE 11 is a view, in side elevation, of the transducer shown in FIGURE 10;

FIGURE 12 is a view, in side elevation, of the magnetic circuit for the transducer shown in FIGURES 10 and 11 and illustrating how the first winding which is common to both cores thereof is wound thereon;

FIGURE 13 is a view, in side elevation, of the cores for the transducer illustrated in FIGURE 12 and showing how the first winding is commonly applied to both cores;

FIGURE 14 is a view, in front elevation, of one of the cores for the transducer showing how the second winding which is individual thereto is wound thereon;

FIGURE 15 is a view, in side elevation, of the other core showing how the third winding which is individual thereto is wound thereon;

FIGURE 16 illustrates diagrammatically the circuits that can be employed to provide two paths along a channel for transmitting sound waves therealong, the illustration being in connection with a communication circuit which may be an overland or underwater cable;

FIGURE 17 shows diagrammatically the circuits that can be used at the receiving end of the line shown in FIGURE 16, it being understood that instead of the conducting circuit between the transmitting and receiving ends, a radio link can be employed;

FIGURE 21 illustrates diagrammatically how the bridge circuit of the present invention having non-linear current conducting devices in the branches can be employed for controlling the operation of a device such as an electric motor;

FIGURE 22 shows diagrammatically how the bridge circuit employing devices having non-linear conducting characteristics in the branches can be employed for indicating the power factor of an alternating current circuit;

FIGURE 23 shows a modification of the power factor indicating system illustrated in FIGURE 22;

FIGURE 24 shows a dynamo electric device constructed in accordance with this invention in which a shaded pole construction is employed in lieu of a split phase arrangement; and FIGURE 25 shows diagrammatically how the windings for the motor in FIGURE 23 can be connected in series circuit relation for energization over a single pair of conductors.

Figure 18:
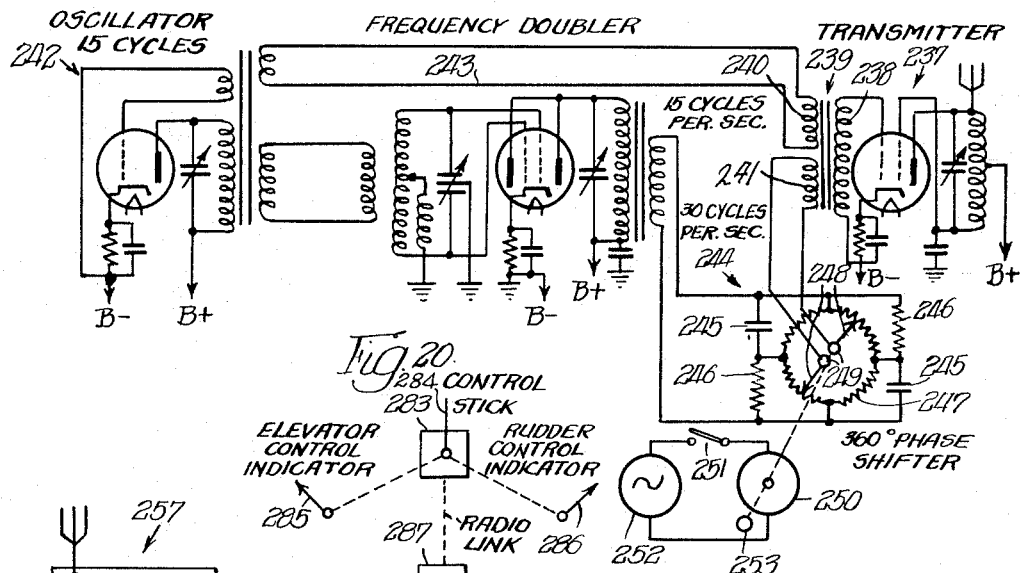
FIGURE 18 illustrates diagrammatically a motion transmitting circuit which can be employed in lieu of the circuit illustrated in FIGURE 1, the phase shift being obtained by using a potentiometer in combination with a bridge circuit composed of resistors and capacitors.

Referring first to FIGURES 1 and 2 of the drawings it will be observed that the reference character 10 designates, generally, a radio transmitter and that the reference character 11 designates, generally, a radio receiver and amplifier that may be mounted on an automobile or airplane. It is pointed out that the present invention can be employed with the radio receiver and amplifier 11 stationarily mounted or carried manually or carried by other means than an automobile or airplane. For illustrative purposes, however, reference is made to an automobile or airplane as will be understood readily. A conventional microphone 12 is employed in conjunction with the radio transmitter 10 for voice transmission and a conventional loud speaker 13 is operated by the radio receiver and amplifier 11 in accordance with usual practice. It will be understood that the radio transmitter 10 and radio receiver and amplifier 11 can take many forms well known to those skilled in the art. Accordingly, no attempt is made herein to show the detail of this apparatus beyond that illustrated in the drawings.

Referring now to FIGURE 1 it will be observed that a transformer, shown generally at 14, is associated with the radio transmitter 10. Specifically a secondary winding 15 is provided which, as shown, can be connected to one of the grids of the transmitting tube of the radio transmitter 10. The transformer 14 is provided with two primary windings 16 and 17. As will be described presently, provision is made for energizing the primary winding 16 with a fundamental frequency which may be of the order of 10,000 cycles per second while, at the same time, the primary winding 17 is energized with double that frequency of 20,000 cycles per second. The reason for selecting these particular frequencies is to employ a frequency which is well above the normal frequency that is heard by the human ear for intelligible speech. As will appear hereinafter other frequencies can be used, the important factor being that one frequency is double that of the other or that it bears a fixed relation to the other. For example, a first and a third or even higher harmonic can be used. Also the second and third harmonics of a fundamental frequency can be used and either can be shifted with respect to the other in accordance with this invention. In some instances it may be desirable to modulate the amplitude of one of the frequencies as a function of a variable to be transmitted.

In order to generate the two frequencies an oscillator, illustrated generally at 20, is employed for generating a fundamental and provision is made for doubling it to provide a second harmonic. It may be of conventional construction and is arranged to energize a transformer that is illustrated, generally, at 21. Since this transformer and the transformer 14 are employed in connection with relatively high frequencies, the magnetic cores thereof are shown as being formed of powdered iron. The transformer 21 is provided with secondary windings 22 and 23.

The secondary winding 22 is connected to energize a primary winding 24 of a transformer that is shown, generally, at 25. The transformer 25 has a secondary winding 26 that is arranged to control the operation of a frequency doubler that is shown, generally, at 27. Thus, if the oscillator 20 is adjusted to oscillate at a frequency of 10,000 cycles per second, the frequency doubler 27 operates to increase that frequency to 20,000 cycles per second. The frequency doubler 27 is arranged to energize a primarily winding 28 of a transformer that is shown, generally, at 29 and has a secondary winding 30 that, as shown, is arranged to energize the primary winding 17 previously referred to at a frequency of 20,000 cycles per second.

With a view to shifting the fundamental frequency generated by the oscillator 20 with respect to the double frequency the secondary winding 23 is arranged to energize a phase splitter that is illustrated, generally, at 33. It will be understood that the double frequency can be shifted with respect to the fundamental frequency, if desired. The output of the phase splitter 33 is applied to a primary winding 34 of a transformer that is shown, generally, at 35 and has two secondary windings 36 and 37. As shown these secondary windings 36 and 37 are connected to diametrically opposite points of a distributed winding 38 that is mounted on a powdered iron annular core 39. It will be noted that the connections to the distributed winding 38 are spaced 90° apart. Instead of employing the inductor formed by the winding 38 and core 39, a circular potentiometer of the resistance type can be used. The winding 38 and the core 39 form a part of a phase shifter that is shown, generally, at 40 and it includes a magnetic rotor 41 that also may be formed of powdered iron and is arranged to rotate within the core 39 and the winding 38. Surrounding the magnetic rotor 41 is a winding 42 which may be connected to slip rings 43 which, as shown, are connected to the primary winding 16. When the magnetic rotor 41 and winding 42 thereon occupy a position in alignment with the connections of the secondary winding 36 to the distributed winding 38, a voltage is induced in the winding 42 which is the output of that phase. Likewise when the magnetic rotor 41 and winding 42 are shifted to be in alignment with the connections of the other secondary winding 37 to the distributed winding 38, the voltage induced in the winding 42 corresponds to that particular phase. At intermediate positions of the magnetic rotor 41 and winding 42 the voltage induced in the winding 42 is the result of the two inputs for that particular position and is a voltage which is shifted in phase from that which appears across either of the secondary windings 36 or 37. By employing the phase splitter 33 and the phase shifter 40 it is possible to shift the phase of the fundamental frequency applied to the primary winding 16 with respect to the double frequency with which the primary winding 17 is energized. It will be shown hereinafter where an advantage is taken of this phase shift to effect a desired control operation.

Any suitable means can be employed for rotating the magnetic rotor 41 and winding 42 thereon. For example a synchronous motor 44 can be used and it can be driven from an alternating current source 45 which may be a conventional 60 cycle alternating current source operating at 115 volts. The synchronous motor 44 can be connected by a shaft 46 to a speed reducer 47 which drives an output shaft 48 through one revolution in 24 hours. It will be understood that the speed reducer 47 can be geared for other speed reduction as may be desired. In accordance with the present invention provision is made for controlling the operation for time indicating means at a remote point and it is for this reason that the speed reducer 47 is arranged to operate the shaft 48 through one revolution in 24 hours. Mounted on the shaft 48, which is shown by a broken line and which is connected to the magnetic rotor 41, is an hour hand 49. It will be noted that the hour hand 49 rotates with respect to a 24 hour clock dial 50. By means of the drive mechanism just described the magnetic rotor 41 and winding 42 thereon are rotated once each 24 hours and as a result the fundamental frequency of 10,000 cycles per second, for example, is advanced one cycle during that time. If it is desired to advance that frequency more than one cycle during that period, provision can be made for rotating the magnetic rotor 41 and winding 42 at the speed desired to give a further advance in the frequency.

The relationship between the fundamental frequency and the double frequency is illustrated graphically in FIGURE 3. The sine wave 52 represents the fundamental frequency for one cycle and the sine wave 53 represents the double frequency during the same period and, as shown, since it is double the frequency, it goes through two complete cycles while the fundamental frequency 52 is going through only a single cycle. The effect of advancing the magnetic rotor 41 with the winding 42 thereon is to shift the phase relationship between the fundamental frequency 52 and the double frequency 53 to effect the desired control result to be described hereinafter. At this time it is pointed out that the double frequency 53 is resolved into a second double frequency which is represented by the sine wave 54. It is displaced 90° from the double frequency 53 in order to provide a rotating magnetic field for a purpose to be described.

Reference now will be made to the circuit connections as illustrated in FIGURE 2 of the drawings. In order to reduce to a minimum the application of the fundamental and double frequencies to the loud speaker 13 a reactor 55 having a powdered iron core may be connected in series therewith. These frequencies then flow principally through a capacitor 56 to conductors 57. It will be understood that the fundamental and double frequencies modulate the carrier wave which is generated by the radio transmitter 10 and that these frequencies are demodulated therefrom by the radio receiver and amplifier 11 along with the voice frequencies with which the carrier is modulated. The radio transmitter 10 and radio receiver 11 merely serve as a connecting link between the secondary winding 15 of the transformer 14 and the conductors 57. If desired, that link can be replaced by directly connecting the conductors 57 to secondary winding 15 under certain circumstances. However, that is not feasible when the radio receiver 11 is mounted on an automobile or airplane or is otherwise made portable or it is impractical to provide the direct connection.

In order to separate the single and double frequencies filter circuits shown, generally, at 58 can be employed. Since they are conventional, they are illustrated merely diagrammatically. The output of the filter circuits 58 is applied to conductors 59, as shown, where the fundamental frequency of 10,000 cycles per second, for example, appears. The double frequency appears across the conductors 60 and is applied to a phase shifting network shown, generally, at 61. The phase shifting network 61 separates the double frequency into two frequencies which are 90° apart as illustrated by the curves 53 and 54 shown in FIGURE 3. The output of the phase shifting network 61 is applied to conductors 62 and 63 each of which is energized at a frequency of 20,000 cycles per second under the assumed condition with the frequency applied to the conductors 63 being shifted 90° in phase with respect to the frequency that is applied to the conductors 62. The phase shifting by the network 61 can be accomplished by any suitable means such as by employing the phase splitter 33 and the phase shifter 40 previously described.

The fundamental frequency and the two double frequencies shifted 90° apart are employed for energizing a dynamo electric device as illustrated, generally, at 66.

It comprises an annular powdered iron core 67 that is surrounded by a first winding comprising coils 68a, 68b, 68c and 68d. This first winding which may be generally referred to as 68 is connected for energization to the conductors 59 and thus is energized with the fundamental frequency. The several windings are so positioned on the iron core 67 that the alternating flux generated thereby is in the same direction as indicated by the arrows associated therewith. It will be observed that the arrows associated with each of the windings 68a, 68b, 68c, and 68d point in the same direction with respect to the flow of magnetic flux induced in the core 67. Also surrounding the core 67 is a secondary winding that comprises windings 69a and 69b. These windings are located on opposite sides of the core 67, are connected to be energized with one of the double frequencies from the conductors 62 and are so arranged, as indicated by the arrows associated therewith, that the double frequency magnetic fluxes induced thereby in the core 67 are in opposite directions. Also applied to the core 67 is a third winding that comprises windings 70a and 70b which are connected in series and arranged to be energized with the second double frequency flux from the conductors 63 that is shifted 90°. It will be noted that the sections 69a and 69b are positioned physically 90° away from the sections 70a and 70b of the third winding.

In FIGURE 2 of the drawings the several windings located on the powdered iron core 67 are shown as being concentrated windings. If desired they may be distributed windings as illustrated in FIGURE 4 of the drawings. In order to avoid confusion the iron core 67 is shown in triplicate once for each of the windings 68, 69a—69b and 70a—70b. It will be observed that the conductors 62 connected to the sections 69a and 69b are spaced 90° from the conductors 63. The energization is such that the double frequency alternating flux induced in the core 67 by the section 69a is opposite that induced by the section 69b. In order to accomplish this with a distributed winding the turns making up the section 69a are wound in one direction, then are brought out in twisted relation 69' and the section 69b is wound in the opposite direction. A similar twisted section 70' is provided between the sections 70a and 70b. It will be understood that each of the windings 68, 69a—69b and 70a—70b is wound on the core 67, the windings being superimposed on each other.

The reaction between the magnetic fluxes generated by the fundamental frequency and by the two double frequencies in the core is to provide a unidirectional field the position of which depends upon the phase relationship between the fundamental frequency, represented by the curve 52, and the double frequencies, represented by the curves 53 and 54 in FIGURE 3. As long as the phase relationshhip between these frequencies remains unchanged, the unidirectional flux or field remains stationary. By shifting the phase relationship between these fluxes it is possible to shift the position of the unidirectional field.

Advantage is taken of this change in the position of the unidirectional field to place in it a permanent magnet 71 which is shown for illustrative purposes as being a bar magnet having permanent poles as indicated. The permanent magnet 71 constitutes a rotor and it may be of the disc type permanently magnetized with two poles if desired in order to facilitate balancing. The position of the permanent magnet rotor 71 is determined by the position of the unidirectional field previously referred to. Within the iron core 67 and around the rotor 71 there is provided a damping ring 72 which tends to reduce oscillations of the rotor 71. Preferably the magnetic core 67 is near saturation at the ampere turns used for energizing the various windings 68, 69a—69b and 70a—70b.

Referring again to FIGURE 3 of the drawings it will be observed that each of the curves 53 and 54 goes through two cycles while the curve 52 goes through only one cycle. Thus, as the curve 52 or the fundamental frequency is advanced through one half a cycle the unidirectional field is shifted through 360° or a complete rotation. As the fundamental frequency is shifted through the second half cycle the unidirectional field is again rotated through 360°. It is for this reason that provision is made in the particular embodiment of the invention disclosed for rotating the shaft 48 through 360° in 24 hours. Where the double frequency is shifted instead of the fundamental, a shift of the former through 360° relative to the latter effects rotation of the unidirectional field through 360°.

Since the unidirectional field rotates twice during 24 hours under the assumed conditions, the permanent magnet rotor 71 rotates through two revolutions during this period. Advantage is taken of this by connecting the rotor 71 by a shaft 73 to an hour hand 74 which rotates with respect to a 12 hour clock dial 75. It will be understood that a suitable gearing can be employed for driving a minute hand in conjunction with the hour hand 74 so that it rotates twelve times for each rotation of the hour hand 74. The gearing is illustrated in FIGURE 2A of the drawings where the rotor 71 is shown fastened to the shaft 73 for driving the hour hand 74. A minute hand 74a is fastened to a sleeve 74b which is journaled on the shaft 73. The sleeve 74b carries a pinion gear 74c which meshes with a gear wheel 74d that is fastened to a shaft 74e. Also fastened to the shaft 74e is a pinion 74f which is in driving engagement with a gear wheel 74g that is fastened to the shaft 73. The ratios of the several pinions and gears are such that for each rotation of the shaft 73, the sleeve 74b and minute hand 74a carried thereby rotate twelve times.

It will be now understood that the hour hand 74 will show the exact time of day provided that the magnetic rotor 41 and winding 42 are rotated through one complete revolution during 24 hours and that the hour hand 49 shows the correct time. Any variation in the position of the hour hand 49 from the correct time will, of course, be reflected in a corresponding variation of the hour hand 74.

It is unnecessary that the radio receiver and amplifier 11 be continuously energized. When it is desired to ascertain the correct time, all that is necessary is to turn on the receiver 11 as is the usual practice for receiving a program. When this takes place, permanent rotor magnet 71 will be positioned in accordance with the position of the magnetic rotor 41 and winding 42 and thus the hour hand 74 will be advanced or retracted, as the case may be, to show the correct time. This makes it unnecessary to provide special synchronizing or adjusting means to bring the hour hand 74 to the correct position.

In certain circumstances it may be desirable to have a step by step operation of the permanent magnet rotor 71. For this purpose the saturable magnetic core of powdered iron 67 may be notched as indicated at 76 in FIGURE 4. If desired 720 notches can be employed corresponding to the sixty minutes in an hour. The windings 68, 69a—69b and 70a—70b then are wound around the core 67 and in the notches or slots 76 as illustrated. Likewise the permanent magnet rotor 71 can be provided with polar extensions 71' as shown in FIGURE 4 to increase the locking effect.

It may be desirable to transmit the fundamental and double frequencies only periodically rather than continuously. For this purpose the grid bias resistor 77 of the transmitter 10 can have a commutator 78 connected thereacross and driven by a shaft 79 from the synchronous motor 44. The arrangement may be such that the resistor 77 is short circuited once each minute or once each five minutes or at some other interval as may be desired during which time no timing signal is transmitted. The hour hand 74 then will advance in a stepwise fashion to take a position corresponding to the next position of the hour hand 49 as will be understood. If desired, instead of periodically arresting the transmission of both frequencies, only one can be arrested.

The frequencies of 10,000 and 20,000 cycles per second were chosen for the system shown in FIGURES 1 and 2 in order to employ frequencies which are well above frequencies required for speech and music thus avoiding interference when applied to the same path. For time keeping and control purposes, it is feasible to employ much lower frequencies. When lower frequencies are employed and the rate of phase shift is relatively low, the side bands are substantially insignificant.

For example, if frequencies of 15 and 30 cycles per second are used for the system as shown in FIGURES 1 and 2 and the phase of the 15 cycle alternating current is advanced relative to the phase of the 30 cycle alternating current so that the rotor 71 turns at the rate of 360° per hour, the phase of the 15 cycle current is advanced at the rate of 180° per hour. The rate of advance is .05° per second or .000138 cycle per second. If the rotor 71 were turned at the rate of 360° per minute, it would be necessary to advance the phase of the 15 cycle alternating current at the rate of 180° per minute or 3° per second. This gives a frequency of .00833 cycle per second.

Since the side bands for such operation are relatively insignificant, it is possible to provide a large number of paths along a single channel for time keeping or control purposes. The number that can be employed is enormous because of the relatively small band width when frequencies of the order of 15 and 30 cycles per second are used. The number of paths is determined by the rate of the phase shift and the ability to filter out the desired frequencies. The higher the rate of phase shift the greater the band width. Thus, if the rate of frequency shift with respect to the other frequency is relatively small, as for control purposes in remotely controlling an airplane, valve, motor or other device, it is possible to obtain a large number of paths along a given channel since the band width required for each path is relatively small. Yet there is no interference.

It is pointed out here that the term channel as employed herein is intended to refer to a pair of conductors interconnecting two points or to a carrier frequency applied to such pair of conductors or to the transmitting frequency of a radio station. In accordance with this invention employing a pair of related frequencies for each variable to be transmitted, it is possible to obtain a large number of paths along each channel which do not interfere with each other and yet provide direct communication between the two points.

A path, according to this invention, is defined as the pair of related frequencies that is employed for transmitting each variable, such as motion of a member, sound waves and the like.

In FIGURE 5 of the drawings there is illustrated a system in which the operation of the dynamo electric device 66 is controlled without the interposition of the radio link. As there shown the first winding comprising coils 68a, 68b, 68c and 68d is connected by the conductors 59 for energization to a generator which is indicated, generally, at 80. For illustrative purposes it is pointed out that the generator 80 may be a 20 cycle generator and that it is provided with a two pole permanent magnet rotor 81 and a cooperating stator 82. The stator 82 is rotatable, rather than fixed, in order to permit the advancement of the frequency generated by the generator 80 in order to shift the fundamental frequency with respect to the double frequency for controlling the operation of the dynamo electric device 66 in the manner previously described. It will be observed that the conductors 59 are connected to the rotatable stator 82 for energization. Slip rings can be employed for this purpose as is readily understood.

The rotor 81 is mounted on a shaft 83 which also carries a four pole permanent magnet rotor 84 that forms a part of a 40 cycle generator that is shown, generally, at 85. Cooperating with the rotor 84 is a stator 86 to which the conductors 62 are connected for energization, these conductors being connected to the windings 69a and 69b. In order to provide the second double frequency another four pole permanent magnet rotor 87 is mounted on the shaft 83. As illustrated, the rotor 87 is shifted 45° away from the position of the rotor 87 on the shaft 83. The rotor 87 forms a part of a second 40 cycle generator that is shown, generally, at 88 and has a stator 89 that is connected to the conductors 63 for energizing the windings 70a and 70b.

In order to operate the generators 80, 85 and 88 in order to generate their respective frequencies with the desired phase relationship a synchronous motor 90 is connected to the shaft 83 and is arranged to operate, as illustrated, at 1200 r.p.m. The synchronous motor 90 may be energized from a suitable source 91 of alternating current, such as 115 volt 60 cycle source.

When the synchronous motor 90 is operating at the stated speed, the generator 80 generates a frequency of 20 cycles and the generators 85 and 88 generate frequencies of 40 cycles which are spaced apart 90° in time phase relation. The resultant of the magnetic fluxes generated in the core 67 by these frequencies is a unidirectional field which is stationary as long as there is no change in the relative position between the current generated by the 20 cycle generator 80 and the double frequency currents generated by the generators 85 and 88. The permanent magnet rotor 71 aligns itself with this unidirectional field. In order to move the rotor 71 the stator 82 is rotated in a manner to be described. The reason for selecting the relatively low frequencies of 20 and 40 cycles is to utilize frequencies which generally are considered to be below the audible range. Thus the radio transmitter 10 shown in FIGURE 1 and previously described could be modulated with these frequencies rather than with the high frequencies there shown.

Where the system shown in FIGURE 5 is intended for time indicating purposes advantage can be taken of the synchronous characteristics of the motor 90 to operate the system. For this purpose a shaft 91 is driven by the motor 90 and it operates a speed reducer 92 the output shaft 93 of which is arranged to drive a pinion 94 which engages a gear wheel 95 that rotates once each 24 hours. A pinion 96 operatively interconnects the gear wheel 95 and the stator 82 so that the latter is rotated once during each 24 hour period. In order to show the time the gear wheel 95 drives the shaft 97 which carries an hour hand 98. The hour hand 98 rotates with respect to a 24 hour clock dial 99.

As the synchronous motor 90 continues to operate at the stated speed and the stator 82 is rotated in the manner described, the unidirectional field which is the resultant of the magnetic fluxes induced in the core 67 rotates through 360° twice during each 24 hour period. Accordingly the rotor 71 likewise makes two such revolutions and the hour hand 74 rotates twice with respect to the 12 hour clock dial during each 24 hour period.

Provision has been made for shifting the fundamental frequency represented by the sine wave 52 in FIGURE 3 while there is no shift in the double frequency represented by the sine wave 53. It is possible, as pointed out above, to shift the latter together with the double frequency represented by the sine wave 54 and provide no shift in the fundamental frequency. To accomplish this the phase splitter 33, FIGURE 1, would be energized from the frequency doubler 27 and the single frequency from the secondary winding 23 would be applied to the primary winding 17. For FIGURE 5 provision would be made for rotating the stators 86 and 89 conjointly, each rotation effecting a rotation of the rotor 71.

Referring now to FIGURES 6 and 7 of the drawings, it will be observed that the reference character 110 designates, generally, a radio transmitter and that the reference character 111 designates, generally, a radio receiver and amplifier. The radio transmitter 110 is of conventional construction and can be employed for transmitting at any of the usual broadcast frequencies. Likewise the radio receiver and amplifier 111 is of conventional construction. Obviously these devices can assume any well known form and shape as may be desired, the important feature being that it be possible to transmit waves from one point to another and to receive them in the manner herein described.

The radio transmitter 110 can be modulated by means of a transformer, shown generally at 114, having a winding 115 that is connected, as shown, to one of the grids of the transmitter 110. Primary windings 116 and 117 are provided in the transformer 110 and are inductively related to the secondary winding 115. As will appear hereinafter a frequency of 5,000 cycles per second can be applied to the primary winding 116 while double that frequency or 10,000 cycles per second are applied to the primary winding 117. The frequencies just mentioned have been selected for illustrative purposes, it being understood that other frequencies can be employed. The criterion to be used, however, is that one of the frequencies is double that of the other or bears a fixed relation to the other as described hereinbefore.

In order to generate the single frequency an oscillator, shown generally at 120, can be employed. It is of conventional construction and for the particular application here shown it is adjusted to generate a frequency of 5,000 cycles per second. Associated with the oscillator 120 is a transformer that is shown, generally, at 121 and has a secondary winding 122 and another secondary winding 123. The secondary winding 122 is connected, as shown, to a primary winding 124 of a transformer shown, generally, at 125 having a secondary winding 126 which is arranged to control the operation of a frequency doubler that is shown, generally, at 127. Under the conditions herein described the frequency doubler 127 acts to double the frequency generated by the oscillator 120. The frequency doubler 127 feeds through a primary winding 128 of a transformer shown, generally, at 129 having a secondary winding 130 which is connected, as shown, to the primary winding 117. In this manner a frequency double that generated by the oscillator 120 is applied to the transformer 114 and the radio transmitter 110 is correspondingly modulated.

It is desired in accordance with this invention to shift the phase relation between the single frequency and the double frequency, i.e., the phase relationship between the 5,000 cycle frequency and the 10,000 cycle frequency. This phase shift is effected in accordance with this invention by means of a phase shifting circuit shown, generally, at 131 and comprising a resistor 132 having a variable capacitance microphone 133 in shunt circuit relation therewith. As indicated in FIGURE 6 of the drawings the microphone 133 controls the magnitude and rate of phase shift of the fundamental or 5,000 cycle frequency as a function, respectively, of the amplitude and frequency of the sound waves applied thereto.

The output of the secondary winding 123, as controlled by the phase shifting 131, is amplified by a suitable amplifier 134 which has associated therewith a primary winding 135 of a transformer shown, generally, at 136. The secondary winding 137 of the transformer 136 is connected by conductors 138 to energize the primary winding 116 of the transformer 114.

Now it will be understood that the radio transmitter 110 is modulated not only by the double frequency applied to the primary winding 117 but also that it is modulated by the single frequency which is applied to the primary winding 116. The phase relationship between these currents is shifted, as described, by the phase shifting circuit 131 under the control of the microphone 133 which, in turn, is controlled by the application of sound waves thereto.

In order to demonstrate the relationship between the frequencies applied to the primary windings 116 and 117 attention is directed to the curves shown in FIGURE 3 of the drawings. Here the reference character 52 designates the single or fundamental frequency, previously described, which may be one full wave of the oscillator 120 which, as indicated for FIGURE 6, operates at a frequency of 5,000 cycles per second. The double frequency applied to the primary winding 117 is indicated by the curve 53. The phase relationship between the curves 52 and 53 is shifted by the phase shifting circuit 131 to effect, at the location where the radio receiver and amplifier 111 is operating, a reconversion of the sound waves into sound waves for reception thereof. Thus the radio transmitter 110 is modulated by a combination of the frequencies represented by the curves 52 and 53 with the phase relationship being shifted as a function of the amplitude and frequency of the sound waves applied to the microphone 133.

It was pointed out above that FIGURE 3 shows another double frequency current by the wave 54 which is shifted in phase relationship with respect to the wave represented by the curve 53 through 90°. This relationship between the currents represented by the curves 53 and 54 remains constant. However, only the fundamental frequency represented by the curve 52 and the double frequency represented by the curve 53 are employed for modulating the radio transmitter 110. The 90° shifted double frequency represented by the curve 54 is employed at the radio receiver and amplifier 111 in connection with the reconversion of the transmitted wave into sound waves in a manner to be described hereinafter.

The radio receiver and amplifier 111 is connected, as shown in FIGURE 7, by conductors 144 to filter circuits, shown generally at 145, which are designed to separate the fundamental frequency represented by the curve 52 from the double frequency represented by the curve 53. Of course these filter circuits can be incorporated in the radio receiver and amplifier 111. However, they are illustrated separately in order to call attention to their function. The fundamental frequency, in this particular instance a frequency of 5,000 cycles per second, is transmitted from the filter circuits 145 over conductors 146 while the double frequency, in this instance a frequency of 10,000 cycles per second, is carried by conductors 147 to a phase shifting network, shown generally at 148, which functions to separate the double frequency into two frequencies 90° apart. For this purpose the circuit connections, generally as illustrated in FIGURE 7, and to be described hereinafter, can be employed. The output of the phase shifting network 148 is then applied to the conductors 149 and 150.

Now it will be understood that the fundamental or single frequency, represented by the curve 52, is applied to the conductors 146 and that one of the double frequencies, represented by the curve 53, is applied to the conductors 149 while the other double frequency, represented by the curve 54 and shifted 90° away from the frequency represented by the curve 53, is applied to the conductors 150.

As shown in FIGURE 7 these conductors are arranged to energize a dynamo electric device or a transducer that is shown, generally, at 153, which is similar to the dynamo electric device 66, previously described. This device comprises an annular saturable magnetic core 154 which preferably is formed of powdered iron as shown. A first winding 155 is provided on the core 154 and it is connected for energization to the conductors 146. The winding 155 may be distributed around the core 154 or it can be subdivided into four concentrated windings indicated at 155a, 155b, 155c and 155d. As indicated by the arrows associated with each of these winding sections, they are connected in such manner as to generate flux and induce the same in the same direction in the core 154.

A second winding 156 is provided on the core 154 and is connected for energization to the conductors 149. The winding 156 can be distributed around the core 154 or it can be wound in two concentrated sections as indicated at 156a and 156b. As indicated by the arrows associated with these windings they are connected so that the same current flowing therethrough induces magnetic flux in the core 154 in opposite directions.

A third winding 157 is provided on the core 154 and it is connected for energization to the conductors 150. Like the winding 156 it can be distributed around the core 154 or it can be arranged in two sections as indicated at 157a and 157b. As indicated by the arrows associated with these windings, they are connected in such manner as to induce flux into the saturable magnetic core 154 in opposite directions.

It will be understood that the application of the single frequency current for energizing the first winding 155, while the windings 156 and 157 are energized, respectively, with double frequency currents in 90° time phase relationship, generates a unidirectional field which remains fixed in space as long as there is no relative phase shift between the fundamental frequency and the two double frequencies. There is a shift in the position in this unidirectional field when there is a shift in the relative phase relationship between the fundamental frequency and the double frequencies. In accordance with this invention this phase shift is effected by changing the position of the fundamental frequency, i.e., the curve 52 with respect to the double frequencies represented by the curves 53 and 54 by means of the variable capacitance microphone 133, FIGURE 6. Thus the sound waves applied to the microphone 133 are converted in the manner and by the means described into a shifting magnetic field that is unidirectional in character. It then remains to provide means responsive to the shifting unidirectional field for converting it into sound waves.

For this purpose a permanent magnet armature 158 is employed and it is positioned within the core 154 as shown in FIGURE 7. It will be understood that the permanent magnet armature 158 does not rotate but rather that it oscillates in accordance with the shifing position of the unidirectional field in which it is placed. The armature 158 is mounted on a shaft 159 which translates the movement of the armature 158 and applies the same to an acoustic diaphragm 160 of a loud speaker. In this manner the sound waves applied to the microphone 133 are reconverted into sound waves emitted by the diaphragm 160.

While the apparatus illustrated in FIGURE 6 has been shown and described as being connected to the apparatus shown in FIGURE 7 through a link which is provided by radio transmitting and receiving means, it will be understood, as previously described, that a direct wire link can be employed if desired. As shown in FIGURE 8 conductors 163 are illustrated as interconnecting the secondary winding 115 of the transformer 114 to the filter circuits 145. Using a direct connection as here shown it is unnecessary to modulate a radio carrier frequency and then to demodulate it in receiving apparatus. This direct wire system can be employed in conjunction with the time keeping system shown in FIGURES 1 and 2 for a master clock and a plurality of slave clocks. In the event that the circuit represented by the conductors 163 should be broken or the power should fail, upon restoration of the circuit or reapplication of the power, the slave clocks will automatically shift to show the time that is indicated by the master clock.

In FIGURE 9 of the drawings there is illustrated a modification of a portion of the system shown in FIGURE 6. The apparatus here shown can be employed in lieu of that shown and described for FIGURE 6.

In FIGURE 9 the secondary winding 123 of the transformer 121 is conencted to a phase splitter which is shown, generally, at 165. As indicated above, such a phase splitter can be employed in the phase shifting network 148 for separating the double frequency into two frequencies in 90° time phase relation. Associated with the phase splitter 165 is a primary winding 166 of a transformer shown, generally, at 167 having two secondary windings 168 and 169 into which the fundamental frequency from the oscillator 120 is induced so as to provide two fundamental frequencies in 90° time phase relationship. The outputs of the secondary windings 168 and 169 are applied to a winding 170 which is inductively related to a winding 171 that is connected by the conductors 138 to the secondary winding 116 of the transformer 114. Interposed between the windings 170 and 171 is an armature 172 the position of which is controlled by sound waves applied to a microphone diaphragm 173. The movement of the armature 172 by the sound waves applied to microphone diaphragm 173 shifts the position of the fundamental frequency represented by the curve 52 with respect to the double frequency represented by the curve 53 in FIGURE 3. This phase shift is a function of the amplitude and frequency of the applied sound waves.

It will be understood that the circuit illustrated in FIGURE 6, modified by the circuit connections shown in FIGURE 9, is operable for use in conjunction with the circuits as shown in FIGURE 7 to reconvert the relatively phase shifted fundamental and double frequencies into sound waves which are emitted by the diaphragm 160.

In FIGURES 10 to 15 of the drawings there is illustrated a modified form of the dynamo electric device or transducer 153. It will be observed that, instead of the annular magnetic core 154 previously described, two rectangular saturable cores 176 and 177 are employed. Preferably they are formed of powdered iron. As shown in FIGURE 11 the cores 176 and 177 are positioned in parallel spaced relation with a permanent magnet armature 178 interposed therebetween. It is connected by a rod 179 to a cone type speaker 180. The permanent magnet armature 178 moves toward and away from the cores 176 and 177 depending upon the energization thereof by the windings 155, 156, 157 which windings are the same windings employed for energizing the transducer 153 shown in FIGURE 7.

In order to illustrate more clearly the arrangement of the windings 155, 156, and 157 the application thereof to the cores 176 and 177 is shown individually.

In FIGURES 12 and 13 it will be observed that the winding 155 to which the fundamental frequency is applied is common to the longer legs of both of the cores 176 and 177. The turns are applied, as previously described, so that the magnetic flux induced by current flowing through the winding 155 is in the same direction throughout the cores 176 and 177.

In FIGURE 14 it will be observed that the winding 156 is applied only to the core 176. It is wound on the longer legs of this core and one half of the winding is arranged to induce magnetic flux into the core 176 in one direction while the other half is arranged to induce magnetic flux in the opposite direction.

In a similar manner FIGURE 15 shows the application of the windings 157 to the other magnetic core 177. It will be observed that one half of this winding is applied to one of the longer legs and is arranged to induce magnetic flux in a direction opposite to that induced by the other half of the winding on the other longer leg.

Referring again to FIGURES 6 and 9 of the drawings, it is pointed out that the microphone 133 and the phase shifting circuit 131 or the microphone 173 and the phase splitter 165 can operate on the double frequency from the frequency doubler 127 to shift its phase relative to the fundamental frequency from the oscillator 120 as a function of the amplitude and frequency of the sound waves to be transmitted.

From a consideration of the foregoing description and of FIGURES 1–15 of the drawings, it will be apparent that the number of communication paths over a single channel is limited only by the frequency spacing that is required to avoid interference and is required for proper functioning of the filter circuits to be described. Thus a large number of paths is available for communication purposes and the existing facilities for such purposes can be greatly expanded.

For control purposes sets of frequencies, such as 15 and 30 cycles per second, 20 and 40 cycles per second, 25 and 50 cycles per second, etc., can be used. If only control functions are to be effected, a complete spectrum of such pairs of frequencies can be utilized over a single channel with the frequencies being relatively closely spaced because of the substantially insignificant side bands as previously pointed out. Such a single path can be either a pair of metallic conductors, a carrier frequency for a telephone cable, or a carrier frequency of a radio transmitter. Of course it also includes the carrier frequency that may be applied to a transmission line as is well known.

In addition to time keeping functions as described in conjunction with FIGURES 1 and 2 of the drawings, the system can be employed for synchronizing Teletype equipment and maintaining it synchronized. Remote control functions can be accomplished such as the control of one or more airplanes, rockets, etc., from a central point. In effect, it can be considered that when the phase shifter 40 of FIGURE 1 is employed to shift the fundamental frequency, the rotor 41 is connected to the rotor 71 through a one to two reduction gear system by a shaft that transmits torque without twisting and is extendable and contractable with the speed of light. Where the phase shifter 40 is employed for shifting the phase of the double frequency current with respect to the fundamental, it can be considered that the imaginary shaft directly interconnects the rotor 41 with the rotor 71 of the dynamo electric device 66. Thus, in either case, any movement of the rotor 41, however slight, is instantly reflected in a corresponding movement of the rotor 71. This movement is either twice that of the rotor 41 or is identical with its movement, depending upon which frequency is shifted.

Figure 20:
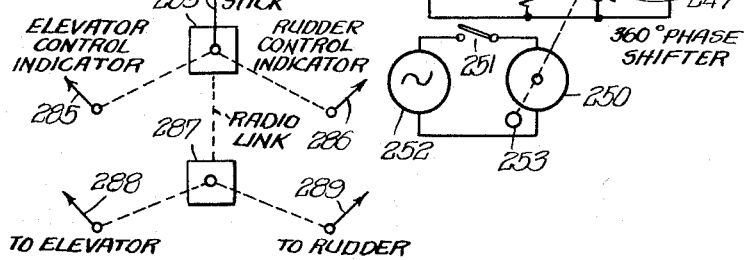
FIGURE 20 illustrates diagrammatically how the present invention can be employed for the remote control of an airplane or the like, either from the ground or from another airplane.

By employing duplicate transmitting and receiving equipment operating, for example, at 20 and 40 cycles per second and 30 and 60 cycles per second, it is possible to operate the rudder and elevator of an airplane for remote guidance thereof as illustrated in FIGURE 20 of the drawings to which further reference will be made hereinafter. Also such a system can be arranged to employ a fundamental frequency of 20 cycles per second, its second harmonic of 40 cycles per second and the second harmonic of the latter of 80 cycles per second. In such case the two separate controls are effected by separately shifting the 20 cycle current and the 80 cycle current with respect to the 40 cycle current.

Where speech or music are to be transmitted, preferably higher frequencies are employed. In FIGURES 6 and 7 of the drawings the frequencies of 5,000 and 10,000 cycles per second are suggested as providing one path over a given channel. Another path over the same channel can be provided by employing 5,100 and 10,200 cycles per second. Likewise paths can be provided using 4,900 and 9,800 cycles per second. It will be shown hereinafter that frequencies of the order of 2,500 and 2,700 cycles per second can be employed, these being about the lowest that are practicable for voice transmission when it is assumed that the maximum frequency to be transmitted is 2,000 cycles per second. Thus a large number of paths is provided over a single channel. It will now be obvious that instead of limiting a single channel to a single path, as is conventional for a radio transmitter operating at a fixed carrier frequency or a telephone cable operating at a fixed carrier frequency, it is possible, by using the present invention, to expand the use of a single channel and use it for transmitting a large number of radio programs, for example, or to carry on a large number of telephone conversations. An even greater number of paths is provided for control purposes where the rate of phase shift of one frequency with respect to the other for a particular path is relatively small. While the number of paths per channel is not unlimited, it is greatly in excess of the single path that heretofore has been available.

When radio transmission is employed, it is feasible to communicate between two stations by generating at one station a fundamental frequency of, say, 5,000 cycles per second and then doubling it to provide a second harmonic the phase of which can be shifted with respect to the fundamental. The composite wave then is employed to modulate the carrier frequency of the one station for receipt by the other station. At the latter the fundamental can be filtered out and employed to generate a second harmonic which is free of the phase shift at the one station and which can be shifted relative to the first harmonic. The resulting composite wave then can be used to modulate the carrier frequency of the other station for transmission to the first station, the carrier frequencies of the stations being different. This permits the station where the fundamental frequency is generated to control the transmission from both stations.

Referring now particularly to FIGURE 16 of the drawings, it will be observed that transmitting equipment illustrated, generally, at 181 and 181' is illustrated for providing two paths along a channel for simultaneous communication therealong. The equipment for each path is identical and there is certain common equipment. For illustrative purposes it is pointed out that the transmitting equipment 181 is arranged to operate using an oscillator 182 that generates a frequency of 2,500 cycles per second while the transmitting equipment 181' employs an oscillator 182' that is tuned to generate a frequency of 2,700 cycles. It has been found that if the fundamental frequencies are 200 cycles apart, it is possible to separate them at the receiving end without any difficulty. Using more efficient filtering equipment, it is possible to use frequencies closer than 200 cycles as will be understood readily.

The fundamental frequency from each of the oscillators 182 and 182' is transferred inductively to amplifiers 183 and 183' respectively and thence through capacitors 184 and 184' and 185 and 185' in series to the grids of a mixer 186 which is common to both of the sets of transmitting equipment 181 and 181'.

The outputs of the oscillators 182 and 182' also are transferred inductively to doublers 187 and 187' which, as will be understood, generate frequencies which are double those of their respective oscillators. The outputs of the doublers 187 and 187' are applied to phase shifters 188 and 188' which are controlled by voice frequencies applied to microphones 189 and 189'. It will be noted that each phase shifter circuit 188 and 188' includes a double triode tube with the grids energized 90° apart by virtue of the phase shifter network comprising capacitors and resistors. The audio inputs from the microphones 189 and 189' are applied to the cathodes of these tubes to change the cathode bias and thus change the balance of two currents which are 90° apart so that one predominates over the other as a function of the voice frequency. The outputs from the phase shifters 188 and 188' are applied to amplifiers 190 and 190' since it is desired that little current be withdrawn from the phase shifters 188 and 188'. It will be understood that the outputs of the amplifiers 190 and 190' comprise frequencies which are double those generated by the oscillators 182 and 182' and they are applied through capacitors 191 and 191' and common capacitors 185 and 185' to the mixer 186. The mixer 186 makes it possible to combine the outputs of the two sets of transmitting equipment 181 and 181' in such manner that the one does not affect the other when applied to the output circuit.

The output of the mixer 186 which consists of the outputs of the two sets of transmitting equipment 181 and 181' is amplified by amplifier 192 and then is applied to primary winding 193 of a transformer 194 having a secondary winding 195. The output of the secondary winding 195 can be applied to a radio transmitter for modulating its carried frequency. For example, the secondary winding 195 can be substituted for the winding 15 of the transformer 14 which modulates the radio transmitter 10 in FIGURE 1 of the drawings.

However, in FIGURE 16 of the secondary winding 195 is arranged to apply the output of the transformer 194 to a transmission line 196 which is indicated by resistors 197, inductors 198 and capacitors 199. The line 196 may be of any desired length. For example, it may be a coaxial cable and may have a length of several hundreds of miles.

The extent of the phase shift of the 5,000 cycle current with respect to the 2,500 cycle current for the transmitting equipment 181 is of the order of 5° under the control of the microphone 189. The extent of the phase shift determines the volume or loudness of the signal while the rate of phase shift is a function of the frequency of the applied signal. A phase advance at the rate of 360° per second is equivalent to a frequency increase of one cycle per second and conversely, if the phase is retarded at the rate of 360° per second, there is a frequency decrease of one cycle per second. When the 5,000 cycle current has its phase alternately advanced or retarded by a thousand cycle current, i.e., a middle range of voice frequency, through an angle of 5°, the phase of the 5,000 cycle current is changed at the rate of 5° per 2,000 cycles or at the rate of 10,000° per second. Thus the frequency change is in the neighborhood of 28 cycles per second. This indicates the required band width for a thousand cycle tone. For a 2,000 cycle tone the band width is twice that or approximately 56 cycles. The maximum for voice frequency would be of the order of 140 cycles per second which would be the required band width for transmitting the signal having a frequency of 5,000 cycles. If desired, a single side band transmission can be used in order to provide more paths along a channel.

It will be appreciated that it is unnecessary to use loading coils along the line 196 or to use repeater stations. The reason for this is that, instead of applying to the line 196 the entire voice frequency, each path is made up of only two frequencies and the phase of one is shifted with respect to the phase of the other as a function of the voice frequency. Any fixed phase shift which takes place between the frequencies as the result of the impedance of the line can be compensated for at either end. It will be shown hereinafter where compensation is provided at the receiving end. Thus no loading coils are required along the line 196. By applying a sufficient voltage to the secondary winding 195 corresponding to the impedance of the line 196 and employing suitable amplifying equipment at the receiving end, it is unnecessary to use repeater stations along the line 196.

The terminals of the line 196 are indicated at 200 and, as indicated in FIGURE 16, they are provided for connection to the receiving apparatus which is illustrated in FIGURE 17 to which reference now will be had.

As there illustrated the terminals 200 from the line 196 are connected to series resonant circuits 204 and 204' each of which comprises a primary winding 205 and 205' of a transformer 206 and 206' and a capacitor 207 and 207'. The series resonant circuit 204 is tuned to series resonance with the line input of 2,500 cycles while the series resonant circuit 204' is tuned to series resonance with the line input of 2,700 cycles. These series resonant circuits are respectively also tuned to the second harmonics of 5,000 cycles and 5,400 cycles. Secondary windings 208 and 208' and 209 and 209' are associated with the primary windings 205 and 205' respectively and are arranged, as illustrated, to energize circuits tuned to and operating at the respective frequencies of 2,500 cycles and 5,000 cycles and 2,700 cycles and 5,400 cycles. These two pairs of frequencies are applied to respective sets of receiving equipment indicated generally at 210 and 210'. Since the receiving equipment for each of these frequencies is substantially identical, the receiving equipment for the 2,500 cycles and 2,700 cycles will be described in detail only.

The outputs of the transformers 206 and 206' through the secondary windings 208 and 208' are applied to amplifiers 211 and 211'. The amplifier 211, for example, is arranged to operate at a value near the threshold value of the tube for the purpose of reducing the amount of the 2,700 cycle signal that is amplified. Conversely the amplifier 211' is similarly operated in order to reduce the amount of 2,500 cycle signal that is amplified. The outputs of these amplifiers are applied to transformers 212 and 212' and thence to amplifiers 213 and 213'. The transformers 212 and 212' and their associated circuits are tuned to filter out all frequencies except the frequencies which it is desired that shall be passed, i.e., 2,500 cycles for the transformer 212 and 2,700 cycles for the transformer 212'. The outputs of the transformers 212 and 212' are fed to amplifiers 213 and 213'.

It will be recalled that there is a fixed phase shift between the fundamental and second harmonic as the result of the impedance of the line 196. This can be compensated for by means of the line phase shift compensator 214 associated with the amplifier 213 and a similar compensator 214' associated with the amplifier 213'. It will be noted that the compensators are made up of capacitors 215 and 215' and potentiometers 216 and 216' connected in series and across the output of the respective transformers 212 and 212', the potentiometers being connected to the grids of the respective amplifiers 213 and 213'. Once the compensator 214 or 214' has been adjusted for the impedance of the line 196 at the particular frequency of the respective receiving equipment, it needs no further adjustment as long as the impedance remains constant.

The outputs of the amplifiers 213 and 213' are applied to transformers 217 and 217' which likewise are tuned to their respective frequencies and which frequencies constitute substantially only the signal that is passed therethrough and applied to power amplifiers 218 and 218'. The outputs of the power amplifiers 218 and 218' are applied to primary windings 219 and 219' of coupling transformers 220 and 220' having secondary windings 221 and 221' that are connected to terminals 222 and 223 and 222' and 223', respectively, of bridge circuits that are indicated, generally, at 224 and 224'. The characteristics of these bridge circuits will be described presently.

As pointed out above similar amplifying and filter equipment is provided for receiving the 5,000 cycle and 5,400 cycle currents so that ultimately these currents are applied to primary windings 225 and 225', respectively, of coupling transformers 226 and 226' having secondary windings 227 and 227' which are connected across terminals 228 and 229 of the bridge circuit 224 and across terminals 228' and 229' of the bridge circuit 224' through capacitors 230 and 230'.

The functioning of the bridge circuits 224 and 224' is such as to produce between the terminals 228 and 229 and 228' and 229' direct currents the magnitudes of which are functions of the rate and magnitude of the phase shift between the frequencies of the respective transmitting and receiving circuits. These varying direct currents are applied to a loudspeaker or receiver 230 and 230' for reproducing the sound waves that were applied, respectively, to the microphones 189 and 189'.

The bridge circuits 224 and 224' are identical and description of one will suffice for both. Devices 231 are provided in at least two adjacent arms of the bridge 224 having non-linear curent carrying characteristics with the terminal 228 to which the double frequency is applied being interposed therebetween. Devices having non-linear current carrying characteristics are neon tubes. Others are germanium diodes and thyrite varistors, such as silicon carbide resistor elements. Also, thermionic tubes can be used. As a matter of fact any device having a non-linear current carrying characteristic, either positive or negative, can be employed provided the device is sufficiently responsive for the frequency applied thereto in order to provide the converting characteristics that are required for changing the fundamental and second harmonics applied to the bridge to direct current. As will be pointed out hereinafter, where lower frequencies are applied to the bridge, it is possible to employ other devices such as tungsten filament lamps in lieu of the devices 231. However, tungsten is too slow in response for use at the higher frequencies.

While each of the arms of the bridge circuit 224 can have incorporated a device having non-linear current carrying characteristics therein, it is preferable in some cases to employ a potentiometer 232 for the other two arms and to provide a tap 233 which is adjustable to balance the bridge to eliminate the fundamental frequency in the output between the terminals 228 and 229. If the bridge is unbalanced, the 2,500 cycle frequency, for example, will provide a whistle in the loud-speaker or receiver 230. Reactors 234 and 234′ are connected between the bridge circuits 224 and 224′ and the loud speakers or receivers 230 and 230′ to eliminate the second harmonic.

By employing the bridge circuit 224 which operates as a result of the interaction between the two frequencies, it is possible to obtain a varying direct current output which can be employed for operating the loud speaker or receiver 230. It is unnecessary to convert the phase shift between the two frequencies into mechanical movement as is done in FIGURE 7, for example, for operating the receiver or loud speaker. The capacitor 230 is provided for preventing the flow of direct current to the source of the double frequency and confining it solely to the circuit including the loud speaker or receiver 230.

The transmitting and receiving equpiment shown in FIGURES 16 and 17 of the drawings can be used for application to cable circuits where presently carrier frequencies are employed to provide a number of channels. In certain instances these carrier frequencies extend from 20,000 to 164,000 cycles with each channel being separated by 4,000 cycles. It has been the practice in the past to modulate the carrier frequency for each channel in accordance with sound waves to be transmitted from one end of the cable to the other. It is possible using the present invention to provide a number of paths along each channel. However, instead of employing a separation of 4,000 cycles, a separation between channels of 20,000 cycles can be used. This would provide eight channels in the range between 20,000 and 164,000 cycles. Then along each of these channels there could be provided eight paths beginning with a frequency of 2,500 cycles and its double harmonic and increasing in steps of 200 cycles for each path until finally a fundamental frequency of 3,900 cycles and double harmonic of 7,800 cycles would be used. This would provide a total of 64 paths along the cable in contradistinction to the 36 channels that presently are available when the carrier frequencies range from 20,000 to 164,000 cycles.

In addition a large number of control frequencies in the lower ranges can be used to provide a large number of control paths in the carrier frequency range below 20,000 cycles.

It has been pointed out hereinbefore that the transmitting equipment shown in FIGURE 16 can be employed for modulating a radio transmitter. When such modulation is employed, it is desirable to operate radio stations at frequencies which are further apart than presently is permitted. For example operating frequencies of 600,000 cycles, 700,000 cycles and 800,000 cycles can be used. Then for each of these transmitting frequencies it would be possible to use frequencies up to 50,000 cycles per second for phase shifting purposes. Thus a frequency combination of 25,000 cycles and its second harmonic of 50,000 cycles could be used as a maximum and these frequencies could be reduced in steps of 200 and 400 cycles per second to give a large number of paths for each transmitting channel.

FIGURE 18 of the drawings shows a transmitting system that can be employed in lieu of the transmitting systems shown in FIGURES 1 and 6 of the drawings, for example. The system here shown includes a transmitter 237 which is controlled from a secondary winding 238 of a transformer shown generally at 239 which is provided with primary windings 240 and 241 that are energized by the two frequencies bearing a fixed relation to each other with provision being made for shifting the phase of one with respect to the phase of the other. In this illustration the primary winding 240 is energized with 15 cycle alternating current and the primary winding 241 is energized with its second harmonic or 30 cycle alternating current.

The 15 cycle alternating current is obtained from an oscillator 242 which also is employed for controlling the operation of a frequency doubler 243 to provide the 30 cycle alternating current.

The phase of the 30 cycle alternating current is shifted by means of a 360° phase shifter that is shown, generally, at 244. It can be employed in lieu of the magnetic phase shifter 40 shown in FIGURE 1. It comprises a bridge circuit having capacitors 245 in two opposite arms and resistors 246 in the other two opposite arms. Interconnecting the corners of the bridge is a potentiometer 247 which is provided with contact arms 248 that are arranged to engage the potentiometer 247 at positions 180° apart. Slip rings 249 serve to interconnect the contact arms 248 to the primary winding 241 for applying the 30 cycle alternating current to the transformer 239 in phase shifted relation with respect to the 15 cycle alternating current applied through the primary winding 240.

Any suitable means can be employed for rotating the contact arms 248. For example, a motor 250 can be used. It can be a synchronous motor and, when switch 251 is closed, it can be energized from a source 252 of alternating current. The motor 250 can be driven in such manner as to rotate the contact arms 248 for time keeping purposes. Manual control is provided by a hand wheel 253 which is mechanically connected, as shown, to rotate manually the contact arms 248.

It will be understood that, in lieu of the radio transmitter 237, a direct connection between the transmitting and sending positions can be provided either by the conductors 63, FIGURE 8, or by the line 196, FIGURE 16.

Figure 19:
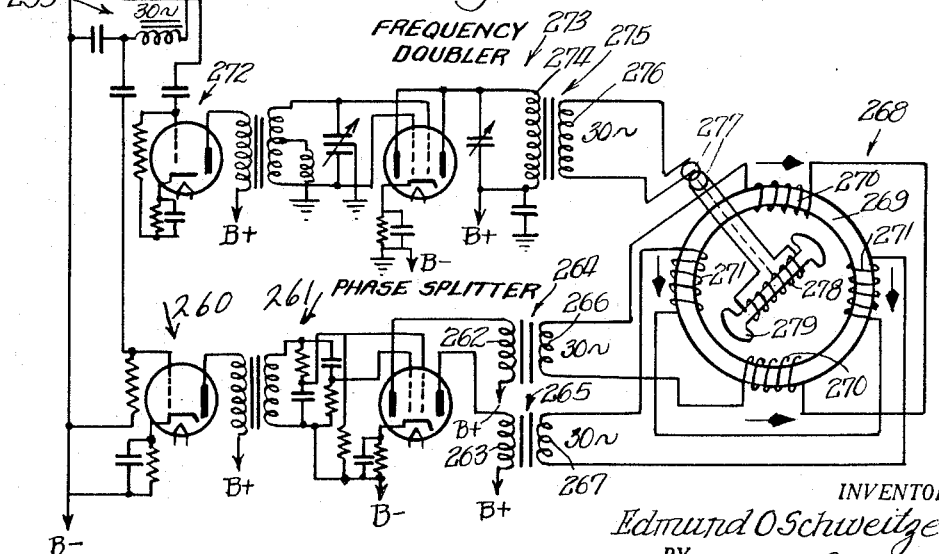
FIGURE 19 shows diagrammatically a receiving circuit for the transmitting system shown in FIGURE 18, the arrangement being similar to that shown in FIGURE 2 but with the dynamo electric device modified and having alternating currents of the same frequency throughout applied thereto.

In FIGURE 19 of the drawings receiving apparatus is illustrated which can be employed in lieu of the receiving apparatus shown in FIGURES 2 and 7 of the drawings. As there shown a radio receiver and amplifier 257 is provided and connected thereto are filter circuits 258 and 259 tuned, respectively, to the incoming 15 and 30 cycle currents.

The 30 cycle filter 259 is connected to an amplifier 260 the output of which is applied to a phase splitter that is shown, generally, at 261. The output of the phase splitter is applied to primary windings 262 and 263 of transformers 264 and 265 having secondary windings 266 and 267. It will be understood that the outputs of the secondary windings 266 and 267 are in 90° time phase relation with respect to each other and that both of these frequencies are shifted with respect to the phase of the 15 cycle current the frequency of which is doubled as will be described presently.

A dynamo electric device, shown generally at 268, is provided for use in the system shown in FIGURE 19 in lieu of the dynamo electric devices shown in FIGURES 2 and 7, for example. It includes a magnetic core 269 and has windings 270 and 271 positioned thereon and connected in series circuit relation respectively to secondary windings 266 and 267 as shown. The windings 270 and 271 are so disposed on the magnetic core 269 that the instantaneous directions of the magnetic fluxes generated thereby are as indicated by the associated arrows.

The output of the 15 cycle filter 258 is applied to an amplifier 272 which controls the operation of a frequency doubler 273 in order to match the 30 cycle frequency which is applied to the windings 270 and 271 on the core 269. The output of the frequency doubler 273 is applied to a primary winding 274 of a transformer 275 which has a secondary winding 276 that is connected to slip rings 277 to which a winding 278 on a rotatably mounted magnetic core 279 is connected. It will be understood that the position of the rotor 279 depends upon the phase relation between the 30 cycle alternating currents in the windings 270 and 271 and the 30 cycle alternating current in the winding 278 on the rotor 279. The rotor 279 will remain stationary or will move depending upon whether there is any phase shift and the extent of the phase shift.

FIGURE 20 shows schematically how the present invention can be employed for remotely controlling an airplane either from a station on the ground or another airplane. A radio transmitter 283 is employed which, for example, may be the same as the transmitter 237 shown in FIGURE 18. A control stick 284 is employed to simulate the control stick in the plane in order to facilitate remote control thereof. Suitable connections are provided between the control stick 284 and an elevator control indicator 285 and a rudder control indicator 286 which also simulate the corresponding devices in the remote airplane.

It will be understood that two sets of control equipment are provided. For example, one set may operate at frequencies of 15 and 30 cycles per second and the other set may operate at frequencies of 20 and 40 cycles per second. By employing a suitable mixer, such as the mixer 186, FIGURE 16, it is possible to combine both sets of frequencies and modulate the same radio transmitter for reception on the remote airplane by radio receiving and amplifying equipment 287 such as that indicated in 257 in FIGURE 19.

The control stick 284 for these purposes would be arranged to control two phase shifter circuits, such as the phase shifter shown at 244 in FIGURE 18. Thus the positions of the contact arms 248 in one case would correspond to the desired position of the elevator control indicator 285 and the positions of the other set of contact arms 248 would correspond to the desired position of the rudder control indicator 286.

On the remotely controlled airplane the receiving equipment may be that shown in FIGURE 19 of the drawings. Also that shown in FIGURE 2 of the drawings can be used. It will be understood that duplicate sets of operating equipment are provided, one for the elevator 288 and the other for the rudder 289. For example the elevator 288 can be connected directly to the rotor 279 of the dynamo electric device 268 or to the rotor 71 of the dynamo electric device 66, FIGURE 2. Similar connections for other dynamo electric devices are provided to the rudder 289. Also, it will be understood that such dynamo electric devices can be employed as relaying devices for in turn controlling the operation of more powerful operating mechanisms such as hydraulic operators or the like.

Referring now particularly to FIGURE 21 of the drawings, it will be observed that the reference character 290 refers to a bridge circuit which is similar to the bridge circuits 224 and 224' shown in FIGURE 17 and described hereinbefore. The bridge circuit 290 is somewhat different in that it employs four devices 291, one in each arm, which have non-linear current carrying characteristics. In this instance it is desired to obtain a substantial amount of power from the bridge circuit 290 and to employ relatively low frequencies for producing the required amount of direct current. For this purpose it is possible to use tungsten filament lamps or thyrite varistors for the devices 291. The direct current terminals 292 of the bridge are connected through a capacitor 293 to a source 294 of double frequency, for example a frequency of 60 cycles per second. The source 294 is a frequency doubler which is energized from a source 295 of alternating current such as a 30 cycle generator. Provision is made by means of a 90° phase shifter 296 for shifting the phase of the 30 cycle current with respect to the second harmonic or output from the frequency doubler 294. A hand wheel 297 is employed for manual control. It will be understood that the phase shifter 296 may be of the type shown at 244 in FIGURE 18 but arranged merely to employ only one-fourth of its range since a complete reversal of the polarity applied to the terminals 292 can be obtained through a 90° phase shift as will be understood readily. The output from the phase shifter 296 is applied to the terminals 298 of the bridge 290. It will be understood that the phase of the second harmonic from the frequency doubler 294 can be shifted with respect to the phase of the output of the 30 cycle generator 295 if desired.

A load device, such as a direct current motor shown generally at 299, is connected between the terminals 292. It may include an armature 300 and a series field winding 301 connected in series circuit relation therewith. In addition, a separately excited field winding 302 is employed that is energized from a suitable direct current source, such as a battery 303.

By shifting the position of the phase shifter 296 by the hand wheel 297 or other suitable means, it is possible to change the magnitude and polarity of the direct current flowing between the terminals 292 and thus to change the speed and direction of rotation of the armature 300.

It is possible to omit two of the non-linear current conducting devices 291 from the bridge 290 and employ in lieu thereof resistors or a potentiometer as shown in FIGURE 17. However, the output of the bridge is decreased by about 50% if only two of the devices are used.

Referring to FIGURE 22 of the drawings, it will be observed that a system is there provided for indicating the power factor of an alternating current circuit such as a 60 cycle circuit represented by the conductors 306 and 307. For this purpose a bridge 308 is employed which is similar to the bridge 224, FIGURE 17, and the bridge 290, FIGURE 21. Here the bridge 308 is provided with a non-linear current conducting device 309 in each of its branches. For example, a neon tube can be used since only a relatively small amount of current is to be drawn from the bridge 308. A potentiometer 310 is provided in each of the arms of the bridge 308 in order to permit individual adjustment for balancing purposes. The terminals 311 and 312 of the bridge are connected to the conductors 307 and 306, respectively, as indicated, and thus these terminals are energized with the fundamental frequency. The double frequency is applied to the terminals 313 and 314 through a capacitor 315 from a secondary winding 316 of the transformer 317 which has a primary winding 318 that is connected across the direct current terminals 319 and 320 of a rectifier bridge 321. The terminals 322 and 323 of the rectifier bridge 321 are connected for energization across a secondary winding 324 which is associated with the line conductor 307 which functions as a single turn primary winding. It will be understood that half cycles of the same polarity are applied to the primary winding 318 of the transformer 317 and thus the output of the secondary winding 316 is an alternating current having a frequency of 120 cycles per second.

Across the terminals 313 and 314 of the bridge 308 a power factor indicator 325 is connected. In reality the power factor indicator 325 is a D'Arsonval type instrument and is provided with a scale which has a zero center and is calibrated in degrees of power factor, leading and lagging as indicated.

In the system as shown in FIGURE 22 the fundamental frequency which is applied to the terminals 311 and 312 of the bridge circuit 308 is derived as a function of the voltage across the conductors 306 and 307 while the second harmonic, which is applied across the terminals 313 and 314, is derived from the current flow in these conductors. It will be understood that these functions can be reversed and the fundamental frequency derived from the current flow in the conductors 306 and 307 and the second harmonic derived from the voltage therebetween.

In FIGURE 23 of the drawings there is shown a modification of the power factor measuring system of FIGURE 22. In the modification a null method of operation is employed and the rectifier bridge 321 is energized from the potential between the conductors 306 and 307. As before the output of the rectifier bridge 321 is applied to a primary winding 318 of a transformer 317. In this instance the secondary winding 316 is connected to energize a phase shifter 244 which is capable of effecting a 360° phase shift. The contact arms 248 are connected to the slip rings 249 which are connected through a capacitor 315 to the terminals 313 and 314 of a bridge 308'. The bridge 308' is formed by resistors 309' having non-linear current characteristics. For example, they may be varistors such as thyrite formed of silicon carbide fused in clay. The terminals 311 and 312 of the bridge 308' are connected across the secondary winding 324 which is inductively related to the conductor 307. A zero center galvanometer 325' is connected through an inductor 325" across the terminals 313 and 314. The choke or inductor 325" is employed to reduce the ripple resulting from the alternating current at double frequency applied to the terminals 313 and 314. The galvanometer 325' is a zero center device for indicating when the bridge 308' is in balance.

The bridge 308' is balanced by adjusting the position of the arms 248 along the potentiometer 247 and relative to a scale 326 which can be calibrated, as indicated, from zero through 360°. It will be understood that the position of the arms 248 is adjusted until the pointer of the galvanometer 325' is in the zero position. Then the reading on the scale 326 indicates the power factor of the circuit comprising the conductors 306 and 307.

When the null method is employed for measuring power factor and the bridge 308' is made up of resistors whose resistance increases with increase in temperature, the null indication is obtained when the fundamental and double frequencies are in phase. Such a resistor is one formed of tungsten such as a tungsten filament lamp. When neon lamps are employed for the non-linear resistance devices, the resistance decreases with increase in current flow. Then the null indication is obtained when the current and voltage or the fundamental and the second harmonic are 90° out of phase.

In FIGURE 24 of the drawings a dynamo electric device is indicated, generally, at 327 which can be employed in lieu of the dynamo electric devices 66 and 153 in FIGURES 2 and 7 of the drawings. This device includes a three legged magnetic core, shown generally at 328, which is provided with end legs 329 and an intermediate leg 330 which are bridged together at their ends as shown. An air gap 331 is provided in the intermediate leg 330 and a permanent magnetic rotor 332 is mounted therein. It will be understood that an electro magnet can be substituted for the permanent magnet rotor 332.

Windings 333 are provided on the end legs 329. They are connected in series circuit relation to generate magnetic flux having directions at a given instant as indicated by the arrows and for energization to terminals A and B which have applied thereto a fundamental frequency such as a frequency of 30 cycles per second.

On the intermediate leg 330 windings 334 are positioned and are connected in series so as to generate flux therein at a given instant indicated by the arrows. The windings 334 are connected for energization to terminals C and D which are energized by alternating current having a frequency which is twice that of the frequency of the alternating current applied to the terminals A and B. In the particular arrangement described the double frequency would be 60 cycles per second.

Instead of splitting the phase of the second harmonic current, as is done for the device as shown in FIGURES 2 and 7 of the drawings, shading windings 335 are provided on the pole members of the intermediate leg 330 which are located on opposite sides of the air gap 331.

Where the dynamo electric device 327 is employed in conjunction with a time keeping system and functions to drive a slave clock, it is possible to energize it over a single pair of conductors as shown in FIGURE 25 of the drawings. Here it will be observed that the terminals B and C are connected together so that the windings 333 and 334 are connected in series circuit relation. Then the fundamental and second harmonics can be applied to the remaining terminals A and D. For example, the generator 336 can be employed as a source of the fundamental frequency of 30 cycles per second and its phase can be shifted by a phase shifter 337. The generator 338, which may be a frequency doubler energized from the source 336, is connected to apply its output between conductors 339 and 340 which are connected, respectively, to the terminals A and D. The reason that both frequencies can be superimposed on a single circuit and on the windings 333 and 334 is that only the fundamental frequency is effective in the windings 333 and only the double harmonic is effective in the windings 334.

Many variations of the invention can be made without departing from the spirit and scope thereof. Only a few will be mentioned.

With reference to the bridge circuits as shown in FIGURES 17, 21 and 22 which employ two or more devices having non-linear current carrying characteristics it is possible, instead of varying the phase between the fundamental and the second harmonic to vary the magnitude of the second harmonic and thus vary correspondingly the direct current output. For example, the magnitude of the second harmonic can be varied as a function of the voice frequency.

Similarly the second harmonic for the system shown in FIGURES 6 and 7 of the drawings can be amplitude modulated and there will be a corresponding modulation of the uni-directional flux in the dynamo electric device 153.

Thus amplitude modulation of one of the two frequencies can be employed to provide another path along a channel in addition to the several paths previously described.

Another variation of the system can employ the circuits shown in FIGURES 6 and 7 of the drawings in conjunction with the direct wire connection shown in FIGURE 8 or FIGURE 16. A radio link also can be used. At the transmitting end a phase shifter, such as a phase shifter 244, FIGURE 18, is used and it is arranged to have separate positions for each of the letters of the alphabet and each of the numbers 1 through 9 and 0. Thus the positions of the contact arms 248 are controlled by a keyboard of a typewriter, for example. At the receiving end the position of the rotor 158 will be governed accordingly and it will assume any of these positions depending upon the particular key that is operated.

In addition, after a key has been depressed to operate the rotor 158 to the corresponding position, a control impulse is transmitted which is arranged to operate a printer at the receiving end for printing a character corresponding to the position of the rotor 158. Thus alternate transmission of a new position of the rotor 158 and a transmission of the control impulse cause a message to be typed out at the receiving station corresponding to the message typed at the transmitting station.

This system of combined phase shift control and impulses is entirely secret for the transmission of information since the position of the rotor 158 or equivalent part of the receiver can be changed for different characters and similar changes can be made at the transmitting end. It is impossible for the message to be detected by unauthorized persons.

The present invention can be employed to transmit information graphically or pictorially or in some other sense, for example, as a mathematical representation in polar coordinates. For polar coordinates the angle between the fundamental ($f$) and the second harmonic ($2f$) can represent the argument as given by the angular position of a pointer attached to a rotatably mounted magnetic core, such as the core 279 in FIGURE 19, and the amplitude by the magnitude of the current ($f$) to vary the length of the pointer, for example, as a solenoid moves a plunger type core in or out in accordance with the current strength, any curve or design can be traced. Shading can be introduced into the design by variations in the strength of the current ($2f$) acting through a solenoid relay to produce corresponding variations in pressure on a stylus. If the figure or design is produced by optical means, then the current ($2f$) can be employed to produce variations in the intensity of a light source.

By way of further illustration assume that a photo conductive cell is mounted at the center of rotation of the contact arms 248 of the phase shifter 244 in FIGURE 18 or at the center of the rotor 41 in FIGURE 1 of the drawings and that the cell is connected in series relation to the coil 241 of the transformer 239, FIGURE 18, so that the light variations received by the cell cause corresponding current variations in ($2f$). Now arrange for the current ($f$) to actuate a solenoid for varying the axial tilt of the photo conductive cell, mounted as described, so that the optical axis of the photo cell will scan a nearly circular area spirally as the phase shifter (the arms 48 or the core 41) is rotated. At the receiving end a mirror is mounted on the rotor 71, FIGURE 2, and it is arranged to be tilted by an electro magnet or a solenoid in accordance with the strength of the current ($f$). Incident upon the mirror is a beam of light from a source energized by current ($2f$) so that the intensity varies as a function of the magnitude of this current.

Since the rotor 71 at the receiver follows in exact synchronism the rotor at the transmitter and the axial tilt of the mirror follows the axial tilt of the photo conductive cell and the intensity of the light beam follows the light variations received thereby, the images scanned at the transmitter will be reproduced at the receiver.

Since certain further changes, combinations and variations can be made in the foregoing system and method and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. In remote control and/or signalling the steps which comprise: transmitting from a first point to a remote point two alternating currents the frequency of one of which is harmonically related to that of the other, at said first point changing a variable characteristic of one of said currents with respect to the other as a function of a variable to be transmitted to said remote point, combining said harmonically related currents at said remote point, and generating at said remote point a unidirectional quantity as the resultant of combining said harmonically related alternating currents which varies in accordance with said function.

2. In remote control and/or signalling the steps which comprise: transmitting from a first point to a remote point two alternating currents the frequency of one of which is harmonically related to that of the other, at said first point shifting the phase of one of said currents with respect to the phase of the other as a function of a variable to be transmitted to said remote point, combining said harmonically related currents at said remote point, and generating at said remote point a unidirectional quantity as the resultant of combining said harmonically related alternating currents which varies in accordance with said function.

3. In remote control and/or signalling the steps which comprise: transmitting from a first point to a remote point two alternating currents the frequency of one of which is harmonically related to that of the other, at said first point shifting the phase of one of said currents with respect to the phase of the other as a function of a variable to be transmitted to said remote point, combining said harmonically related currents at said remote point, and generating at said remote point a unidirectional magnetic field as the resultant of combining said harmonically related alternating currents which varies in accordance with said function.

4. In remote control and/or signalling the steps which comprise: transmitting from a first point to a remote point two alternating currents the frequency of one of which is harmonically related to that of the other, at said first point shifting the phase of one of said currents with respect to the phase of the other as a function of a variable to be transmitted to said remote point, combining said harmonically related currents at said remote point, and generating at said remote point a unidirectional current as the resultant of combining said harmonically related alternating currents which varies in accordance with said function.

5. Method of effecting the movement of a magnetic member which comprises: subjecting the magnetic member to an alternating flux and to a shifting alternating flux the frequency of which bears a fixed relation to that of said alternating flux, and shifting the phase relation between said fluxes to effect a corresponding movement of said magnetic member.

6. Method of effecting the movement of a magnetic member which comprises: subjecting the magnetic member to an alternating flux and to a shifting alternating flux the frequency of which is twice that of said alternating flux, and shifting the phase relation between said fluxes to effect a corresponding movement of said magnetic member.

7. Method of indicating time at a remote point from a control point which comprises: transmitting from a control point to a remote point two alternating currents the frequency of one of which is twice that of the other, shifting the phase relation of one of said currents with respect to the other as a function of time, at the remote point generating a unidirectional field as the direct resultant of said alternating currents the position of which shifts as said function of time, and moving a time indicating member in accordance with the movement of said unidirectional field.

8. Method of indicating time at a remote point from a control point which comprises: transmitting from a control point to a remote point two alternating currents the frequency of one of which is twice that of the other, shifting the phase relation of one of said currents with respect to the other as a function of time, periodically interrupting the transmission of at least one of said alternating currents, at the remote point generating a unidirectional field as the direct resultant of said alternating currents the position of which shifts as said function of time, and moving a time indicating member in accordance with the movement of said unidirectional field.

9. Method of indicating time at a remote point from a control point which comprises: transmitting via radio from a control point to a remote point two alternating currents the frequency of one of which is twice that of the other, shifting the phase relation of one of said currents with respect to the other as a function of time, at the remote point generating a unidirectional field as the direct resultant of said alternating currents the position of which shifts as said function of time, and moving a time indicating member in accordance with the movement of said unidirectional field.

10. A remote indicating system comprising, in combination, radio transmitting and receiving means, means for modulating said transmitting means with a first alternating current and with a second alternating current having double the frequency of said first alternating current, means for shifting the phase relationship between said first and second alternating currents, filter circuit means at said receiving means for separating said alternating currents, phase shifting means for splitting the double frequency alternating current into two alternating currents in quadrature with respect to each other, a magnetic core structure, a first winding means on said core structure connected to be energized by the first alternating current from said filter means to induce an alternating magnetic flux in said core structure, a second winding means on said core structure connected to be energized by said two alternating currents in quadrature to induce a shifting alternating magnetic flux in said core structure having a frequency double that of the first mentioned alternating flux, the resultant of said fluxes being a unidirectional field the position of which shifts in accordance with the degree of shift between said first and second alternating currents, and magnetic means responsive to said field.

11. A remote indicating system comprising, in combination, radio transmitting and receiving means, means for modulating said transmitting means with a first alternating current and with a second alternating current having double the frequency of said first alternating current, means for shifting the phase relationship between said first and second alternating currents through 360 degrees in 24 hours, filter circuit means at said receiving means for separating said alternating currents, phase shifting means for splitting the double frequency alternating current into two alternating currents in quadrature with respect to each other, an annular magnetic core structure, a first winding means on said core structure connected to be energized by the first alternating current from said filter means to induce an alternating magnetic flux in said core structure, a second winding means on said core structure connected to be energized by said two alternating currents in quadrature to induce a shifting alternating magnetic flux in said core structure having a frequency double that of the first mentioned alternating flux, the resultant of said fluxes being a unidirectional field the position of which shifts in accordance with the degree of shift between said first and second alternating currents, rotatable magnetic means responsive to said field and rotated twice through 360 degrees in 24 hours, and time indicating means driven by said rotatable magnetic means.

12. The invention as set forth in claim 11 wherein means are provided at the transmitting means for periodically modulating the same with the first and second alternating currents.

13. In combination, means providing first, second and third alternating currents; said second and third alternating currents each being double the frequency of said first alternating current and said third alternating current being in quadrature with said second alternating current; an annular magnetic core; first, second and third windings inductively related to said core and connected to be energized respectively by said first, second and third alternating currents; said first winding inducing alternating magnetic flux in said core in the same direction throughout, said second and third windings each being arranged in two sections with a section of each inducing alternating magnetic flux in said core in a direction opposite to the direction of the other section, the resultant of said magnetic fluxes being a unidirectional field, and rotatable magnetic means responsive to said unidirectional field.

14. In combination, means providing first, second and third alternating currents; said second and third alternating currents each being double the frequency of said first alternating current and said third alternating current being in quadrature with said second alternating current; an annular magnetic core; first, second and third windings inductively related to said core and connected to be energized respectively by said first, second and third alternating currents; said first winding inducing alternating magnetic flux in said core in the same direction throughout, said second and third windings each being arranged in two sections with a section of each inducing alternating magnetic flux in said core in a direction opposite to the direction of the other section, the resultant of said magnetic fluxes being a unidirectional field, rotatable magnetic means responsive to said unidirectional field, and means for shifting the relative phase relation of said first alternating current with respect to said second and third alternating currents whereby the angular position of said unidirectional field is correspondingly shifted accompanied by like movement of said rotatable magnetic means.

15. In combination, means providing first, second and third alternating currents; said second and third alternating currents each being double the frequency of said first alternating current and said third alternating current being in quadrature with said second alternating current; an annular magnetic core; first, second and third windings inductively related to said core and connected to be energized respectively by said first, second and third alternating currents; said first winding inducing alternating magnetic flux in said core in the same direction throughout, said second and third windings each being arranged in two sections with a section of each inducing alternating magnetic flux in said core in a direction opposite to the direction of the other section, the resultant of said magnetic fluxes being a unidirectional field, rotatable magnetic means responsive to said unidirectional field, and means for shifting the relative phase relation of said first alternating current with respect to said second and third winding currents through 360 degrees whereby the angular position of said unidirectional field is shifted through 720 degrees accompanied by like movement of said rotatable magnetic means.

16. In combination, a magnetic core structure, means for inducing an alternating magnetic flux in said magnetic core structure, means for inducing a second alternating magnetic flux in said magnetic core structure having a frequency double that of the first mentioned alternating flux means for inducing a third alternating magnetic flux in said magnetic core structure of the same frequency as one of said fluxes and shifted with respect thereto in time and space phase a predetermined extent, the resultant of said fluxes being a unidirectional field, and magnetic means responsive to said field.

17. In combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, and magnetic means responsive to said field.

18. In combination, a magnetic core structure, means for inducing an alternating magnetic flux in said magnetic core structure, means for inducing a second alternating magnetic flux in said magnetic core structure having a frequency double that of the first mentioned alternating flux, means for inducing a third alternating magnetic flux in said magnetic core structure of the same frequency as one of said fluxes and shifted with respect thereto in time and space phase a predetermined extent, the resultant of said fluxes being a unidirectional field, magnetic means responsive to said field, and means changing the phase relationship between one of said fluxes and the other two fluxes to effect corresponding change in the position of said magnetic means.

19. In combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, magnetic means responsive to said field, and means changing the phase relationship between said fluxes to effect corresponding change in the position of said magnetic means.

20. In combination, an annular magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, rotatable magnetic means responsive to said field, and means changing the phase relationship between said fluxes through 360 degrees whereby the angular position of said unidirectional field is shifted through 720 degrees accompanied by like movement of said rotatable magnetic means.

21. In combination, an annular magnetic core structure, means for inducing an alternating magnetic flux in said magnetic core structure including a distributed winding thereon, means for inducing a shifting alternating magnetic flux in said magnetic core structure having a frequency double that of the first mentioned alternating flux including two distributed windings one half of each of which is wound in one direction and the other half is wound in the opposite direction, the result of said fluxes being a unidirectional field, and magnetic means responsive to said field.

22. In combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, a rotatable armature responsive to said field, a first rotatable indicating member driven by said armature, and a second rotatable indicating member, and gearing operatively interconnecting said indicating members characterized by driving said second indicating member at a higher speed than that of said first indicating member.

23. In combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, a rotatable armature responsive to said field, a first rotatable indicating member driven by said armature, a second rotatable indicating member, and gearing operatively interconnecting said indicating members characterized by driving said second indicating member at a higher speed than that of said first indicating member, and means changing the phase relationship between said fluxes to effect corresponding change in the position of said armature.

24. In combination, a magnetic core structure, means for inducing an alternating magnetic flux in said magnetic core structure, means for inducing a shifting alternating magnetic flux in said magnetic core structure having a frequency double that of the first mentioned alternating flux, the resultant of said fluxes being a unidirectional field, a rotatable armature responsive to said field, an hour hand driven by said armature, a minute hand, gearing between said hour hand and said minute hand driving the latter at twelve times the speed of the former, and means changing the phase relationship between said fluxes to rotate said armature once each twelve hours.

References Cited in the file of this patent

UNITED STATES PATENTS

| | | |
|---|---|---|
| 1,946,098 | Morrison | Feb. 6, 1934 |
| 2,005,158 | Nicholson | June 18, 1935 |
| 2,236,374 | Marrison | Mar. 25, 1941 |
| 2,323,566 | Peterson | July 6, 1943 |
| 2,402,973 | Moore | July 2, 1946 |
| 2,404,238 | Loughlin et al. | July 16, 1946 |
| 2,437,558 | Rockwood | Mar. 9, 1948 |
| 2,526,425 | Schultheis | Oct. 17, 1950 |
| 2,542,627 | Chevallier | Feb. 20, 1951 |
| 2,562,682 | Schmitt | July 31, 1951 |
| 2,582,957 | Borsum et al. | Jan. 22, 1952 |
| 2,609,535 | Harmon | Sept. 2, 1952 |
| 2,648,832 | Johnson | Aug. 11, 1953 |